(12) United States Patent
Ashley et al.

(10) Patent No.: US 10,298,610 B2
(45) Date of Patent: *May 21, 2019

(54) EFFICIENT AND SECURE USER CREDENTIAL STORE FOR CREDENTIALS ENFORCEMENT USING A FIREWALL

(71) Applicant: Palo Alto Networks, Inc., Santa Clara, CA (US)

(72) Inventors: Robert Earle Ashley, Santa Clara, CA (US); Ho Yu Lam, Santa Clara, CA (US); Xuanyu Jin, San Jose, CA (US); Suiqiang Deng, Fremont, CA (US); Taylor Ettema, San Jose, CA (US); Robert Tesh, Morgan Hill, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/030,594

(22) Filed: Jul. 9, 2018

(65) Prior Publication Data
US 2018/0332079 A1 Nov. 15, 2018

Related U.S. Application Data

(63) Continuation of application No. 14/815,354, filed on Jul. 31, 2015, now Pat. No. 10,051,001.

(51) Int. Cl.
*H04L 29/06* (2006.01)
*G06F 16/951* (2019.01)
*G06F 16/957* (2019.01)

(52) U.S. Cl.
CPC ........ *H04L 63/1433* (2013.01); *G06F 16/951* (2019.01); *G06F 16/9574* (2019.01);
(Continued)

(58) Field of Classification Search
CPC ................. H04L 63/14; H04L 63/1408; H04L 63/1433; H04L 63/20; H04L 63/0227; H04L 63/0245; H04L 63/02; H04L 63/10
See application file for complete search history.

(56) References Cited

U.S. PATENT DOCUMENTS 6,606,663 B1 8/2003 Liao
7,082,415 B1 7/2006 Robinson
(Continued)

OTHER PUBLICATIONS

Author Unknown, Accounts Help, Prevent Phishing with Password Alert, downloaded on Apr. 29, 2015.
(Continued)

*Primary Examiner* — Edward Zee
(74) *Attorney, Agent, or Firm* — Van Pelt, Yi & James LLP

(57) ABSTRACT

Techniques for an efficient and secure store for credentials enforcement using a firewall are disclosed. In some embodiments, a system, process, and/or computer program product for an efficient and secure store for credentials enforcement using a firewall includes receiving a space-efficient and secure data structure, such as bloom filter, from an agent executed on an authentication server, in which the bloom filter is generated by the agent based on a transformation of a plurality of user credentials extracted from the authentication server and/or intercepted at the authentication server; storing the bloom filter on the network device (e.g., in a cache on the network device); and monitoring network traffic at the network device to perform credentials enforcement using the bloom filter.

19 Claims, 12 Drawing Sheets

(52) U.S. Cl.
CPC ........ *H04L 63/0227* (2013.01); *H04L 63/083* (2013.01); *H04L 63/10* (2013.01); *H04L 63/14* (2013.01); *H04L 63/1408* (2013.01); *H04L 63/20* (2013.01)

(56) References Cited

U.S. PATENT DOCUMENTS

| | | |
|---|---|---|
| 7,152,244 B2 | 12/2006 | Toomey |
| 8,490,162 B1 | 7/2013 | Popoveniuc |
| 8,499,355 B1 | 7/2013 | Goncharov |
| 8,640,231 B2 | 1/2014 | Florencio |
| 8,769,607 B1 | 7/2014 | Jerdonek |
| 9,306,943 B1 | 4/2016 | Bailey |
| 9,483,627 B1 | 11/2016 | Ferg |
| 2003/0005036 A1 | 1/2003 | Mitzenmacher |
| 2004/0015725 A1 | 1/2004 | Boneh |
| 2007/0006305 A1 | 1/2007 | Florencio |
| 2007/0199054 A1* | 8/2007 | Florencio ............ H04L 63/1416 726/5 |
| 2008/0066167 A1 | 3/2008 | Andri |
| 2009/0025080 A1 | 1/2009 | Lund |
| 2009/0241173 A1 | 9/2009 | Troyansky |
| 2011/0231653 A1 | 9/2011 | Bollay |
| 2013/0227684 A1 | 8/2013 | Troyansky |
| 2013/0262655 A1 | 10/2013 | Deschônes |
| 2014/0282816 A1 | 9/2014 | Xie |
| 2015/0339484 A1 | 11/2015 | Shah |

OTHER PUBLICATIONS

Author Unknown, Google Apps Help, Phishing Prevention with Password Alert FAQ, downloaded on Apr. 29, 2015.

Author Unknown, Have I been Pwned?, Check if you Have an Account that has been Compromised in a Data Breach, downloaded on Jul. 30, 2015.

Author Unknown, Official Google Blog: Protect your Google Account with Password Alert, Insights from Googlers into our Products, Technology, and the Google Culture, Apr. 29, 2015.

Author Unknown, Sunera, Sunera Information Security Blog, Starting an Active Directory Password Auditing Program, May 8, 2014.

Bonomi et al., An Improved Construction for Counting Bloom Filters, 2006.

Eugene H. Spafford, OPUS: Preventing Weak Password Choices, Jun. 1991.

John C.A Bambenek, Data Loss Prevention, SANS Institute InfoSec Reading Room, Aug. 15, 2008.

* cited by examiner

US 10,298,610 B2

EFFICIENT AND SECURE USER CREDENTIAL STORE FOR CREDENTIALS ENFORCEMENT USING A FIREWALL

CROSS REFERENCE TO OTHER APPLICATIONS

This application is a continuation of co-pending U.S. patent application Ser. No. 14/815,354 entitled EFFICIENT AND SECURE USER CREDENTIAL STORE FOR CREDENTIALS ENFORCEMENT USING A FIREWALL filed Jul. 31, 2015 which is incorporated herein by reference for all purposes.

BACKGROUND OF THE INVENTION

A firewall generally protects networks from unauthorized access while permitting authorized communications to pass through the firewall. A firewall is typically a device or a set of devices, or software executed on a device, such as a computer, that provides a firewall function for network access. For example, firewalls can be integrated into operating systems of devices (e.g., computers, smart phones, or other types of network communication capable devices). Firewalls can also be integrated into or executed as software on computer servers, gateways, network/routing devices (e.g., network routers), or data appliances (e.g., security appliances or other types of special purpose devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

BRIEF DESCRIPTION OF THE DRAWINGS

Various embodiments of the invention are disclosed in the following detailed description and the accompanying drawings.

DETAILED DESCRIPTION

Figure 1:
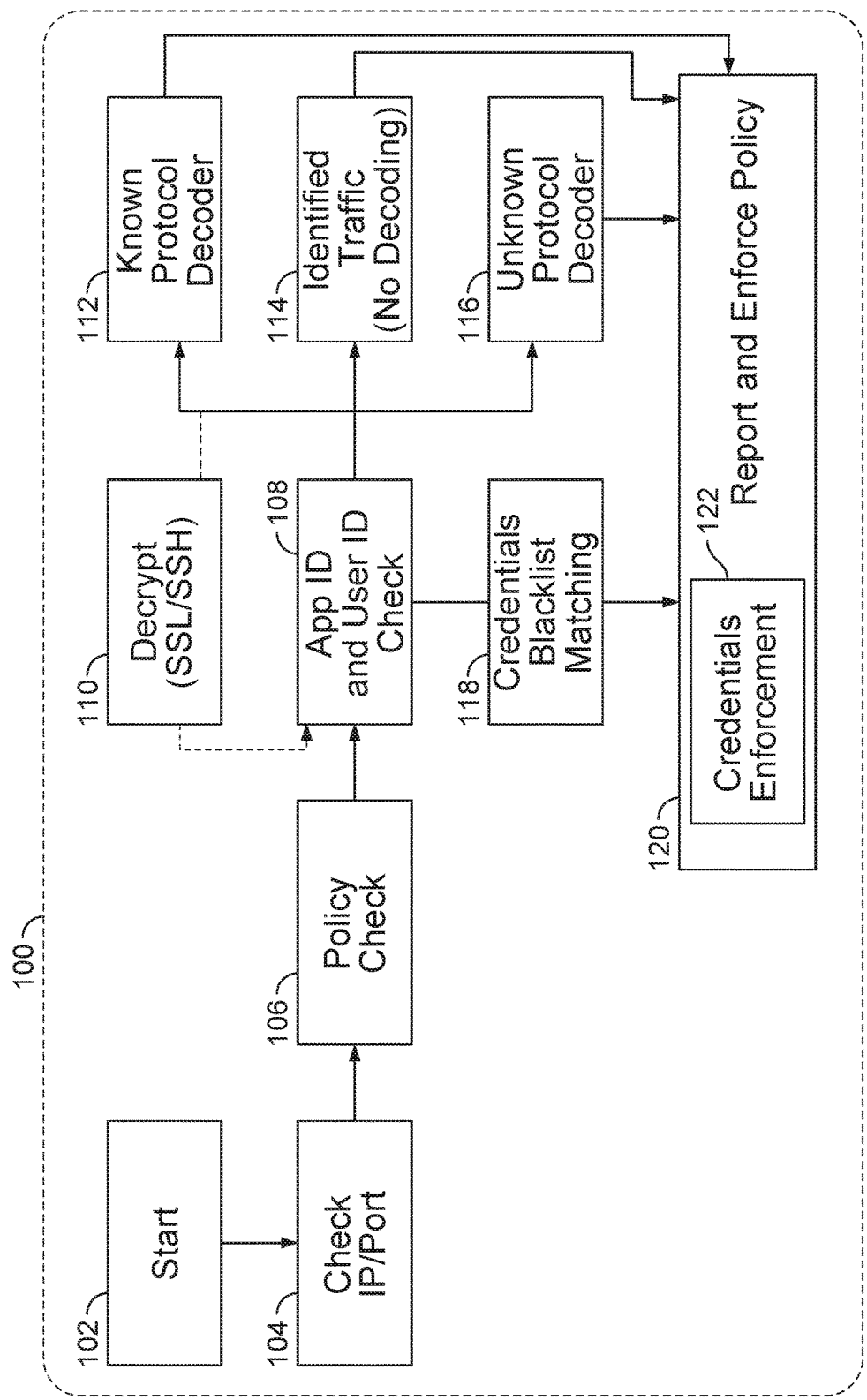
FIG. 1 is a functional diagram of an architecture of a network device that can be used for providing credentials enforcement using a firewall in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as software applications on various types of devices or security devices, such as computer servers, gateways, network/routing devices (e.g., network routers), or data appliances (e.g., security appliances or other types of special purpose devices).

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as described herein).

Security devices (e.g., security appliances, security gateways, security services, and/or other security devices) can include various security functions (e.g., firewall, anti-malware, intrusion prevention/detection, and/or other security functions), networking functions (e.g., routing, Quality of Service (QoS), workload balancing of network related resources, and/or other networking functions), and/or other functions. For example, routing functions can be based on source information (e.g., IP address and port), destination information (e.g., IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform stateful-based packet inspection in which each packet is examined within the context of a series of packets associated with that network transmission's flow of packets/packet flow (e.g., stateful firewalls or third generation firewalls). This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content (e.g., next generation firewalls). In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls). For example, Palo Alto Networks' next generation firewalls enable enterprises to identify and control applications, users, and content—not just ports, IP addresses, and packets—using various identification technologies, such as the following: APP-ID for accurate application identification, User-ID for user identification (e.g., by user or user group), and Content-ID for real-time content scanning (e.g., controls web surfing and limits data and file transfers). These identification technologies allow enterprises to securely enable application usage using business-relevant concepts, instead of following the traditional approach offered by traditional port-blocking firewalls. Also, special purpose hardware for next generation firewalls implemented, for example, as dedicated appliances generally provide higher performance levels for application inspection than software executed on general purpose hardware (e.g., such as security appliances provided by Palo Alto Networks, Inc., which utilize dedicated, function specific processing that is tightly integrated with a single-pass software engine to maximize network throughput while minimizing latency).

However, reusing or sharing user credentials for authentication can create security vulnerabilities for enterprises. In some cases, an employee may reuse username and/or password credentials for user authentication with their corporate account(s) across one or more different external sites (e.g., web sites that are distinct from the enterprise or other external computing resources accessible via the Internet).

For example, assume that an employee, Bob, of ACME Company uses a password, such as BOB-PASS1, as his password for access to his corporate email account at ACME Company. Assume that Bob also uses that same password as his password for accessing an external site for authentication, such as for accessing his account on another external site (e.g., an online account from another entity, which may be a trusted entity, such as Apple or Google, or may be an unknown/untrusted entity). This can create a security risk for ACME Company, because Bob's user credentials can be compromised through an external site, such as example-site.com, which then presents a security risk for ACME Company (e.g., the external example-site.com site may have been targeted for an attack and its user credentials are compromised by an attacker, who can attempt to reuse those credentials for a given user, such as using Bob's compromised credentials from example-site.com, to attack an enterprise network, such as to access a network/systems of the ACME Company enterprise network).

As a result, an enterprise may have a policy that requires that their internal users (e.g., employees and contractors) do not reuse user credentials associated with an enterprise account (e.g., system/network access username and/or password) on any external sites (e.g., or at least not on any untrusted/unauthorized external sites). As such, it would be desirable to provide techniques that allow enterprises to enforce a policy that facilitates enforcement of such user credential requirements for their internal users creating and/or using authentication credentials on external sites (e.g., web sites, web services, and/or other third party/external online sites/services that require the creation of user credentials for user authentication) that match that user's credentials associated with an enterprise account. However, because such external site authentication is generally created on a site-by-site basis that is not under the control of the enterprise (e.g., the security/IT of the enterprise), the enterprise is generally unable to automatically enforce such policies.

As a result, this problem presents a security risk for enterprises that users may also use the same and/or similar user login/password credentials for external sites. In particular, certain external sites may be compromised and/or not reputable (e.g., untrustworthy), and/or not subject to the enterprise security constraints, policies, and/or controls. As such, reusing/duplicating user authentication credentials as used by the user on their enterprise with external sites or reusing/duplicating user credentials across multiple external entities generally presents a single point of failure/security risk that the enterprise may desire to avoid. For example, such can pose serious security risks to an enterprise, such as for its sales personnel using external sales/CRM sites/services, its marketing personnel using an external online networking/marketing site, its users/employees using an external collaboration site/service, its users/employees using an external email site/service, and/or its users/employees using other external sites that can, in some cases, be used for enterprise related purposes by internal users of the enterprise.

As another example, large-scale password leaks that can impact external sites can also pose security risks for the enterprise if one or more users reuse their enterprise credentials on such external sites. There are several well-known large-scale password leaks, such as the LinkedIn site had approximately 6.5 million password hashes stolen in 2012, and eBay had an employee account compromised that led to significant customer data exposure in 2014.

As yet another example, phishing attacks are generally a prominent attack vector. Phishing can be used by hackers to obtain user credentials for external sites. As a result, phishing can also pose security risks for the enterprise if one or more of their enterprise users reuse their enterprise credentials on such external sites.

Existing approaches attempt to address certain aspects related to user credentials and security. An example existing approach attempts to perform password complexity enforcement, such as by checking password complexity of user credentials (e.g., checking password complexity at time of creation/registering of user credentials and/or based on brute-force testing). Another example existing approach attempts to provide education to users, such as providing phishing awareness education and notification. Yet another example existing approach attempts to provide remediation after passwords are known to have leaked (e.g., actively crawling sources of publicly leaked user credentials/passwords, such as Pastebin leaks, and notifying affected users).

However, existing approaches fail to provide for credentials enforcement that can adequately address the above-described problems.

Overview of Techniques for Credentials Enforcement Using a Firewall

Thus, what are needed are new and improved techniques for credentials enforcement. Accordingly, techniques for credentials enforcement using a firewall are disclosed.

For example, the various techniques described herein can facilitate credentials enforcement of a firewall policy to external sites that are generally not under the control of the enterprise. Such techniques can also promote and enforce proper credentials management policies for users of the enterprise. Also, these techniques can alert the enterprise (e.g., internal IT/network/security administrators (admins) of the enterprise) to users who have credentials to external sites that present potential security risks for the enterprise. In one embodiment, responsive actions, such as account password reset, two-factor authentication, account lockout, and/or other responsive actions, can be triggered automatically when credential reuse or attacks have been detected (e.g., a brute-force password attack from an untrusted source with passwords that match valid credentials, or known leaked passwords are being used).

In some embodiments, a system, process, and/or computer program product for credentials enforcement using a firewall includes storing a plurality of user credentials at a network device; monitoring network traffic at the network device to determine if there is a match with one or more of the plurality of user credentials; and performing an action if the match is determined.

In an example implementation, the credentials enforcement using a firewall can monitor network activity for sensitive user login information (e.g., filtering the network activity/traffic using, for example, a blacklist that can include/specify credentials such as the following: enterprise credentials (username and/or password), leaked passwords, custom blacklisted credentials ("weak" passwords), and/or other credentials of interest). For example, the credentials enforcement using a firewall can be used to prevent users on an enterprise network protected by/behind the firewall from giving out their credentials (e.g., enterprise or other login credentials) to an external site (e.g., a third party web site(s) that may be compromised in the future (registration); and/or web sites categorized as unknown and/or phishing sites). As another example, the credentials enforcement using a firewall can be used to alert users behind the firewall if their currently used credentials (e.g., enterprise or other login credentials) have been added to a blacklist upon their next login attempt. As yet another example, the blacklist can be used for intrusion prevention via detecting invalid brute forced blacklisted credentials.

In one embodiment, the system, process, and/or computer program product for credentials enforcement using a firewall further includes receiving the plurality of user credentials from an agent executed on an authentication server; and storing the plurality of user credentials in a cache on the network device.

In one embodiment, the system, process, and/or computer program product for credentials enforcement using a firewall further includes monitoring network communications between a client and an external site; determining if the client sends a request that includes user credentials for authentication at the external site; and performing an action in response to determining that the client sent the request that includes user credentials for authentication at the external site that match one or more of the plurality of user credentials stored at the network device.

In one embodiment, the system, process, and/or computer program product for credentials enforcement using a firewall further includes monitoring encrypted network communications between a client and an external site (e.g., using a security device, such as a firewall to provide man-in-the-middle decryption techniques, such as described herein), in which the encrypted network communications are encrypted using a first protocol (e.g., Secure Sockets Layer (SSL) protocol, HTTPS, or another protocol for encrypted network communications); and determining if the client sends a request that includes user credentials for an external site authentication.

For example, many external sites (e.g., web sites, apps for mobile devices that provide cloud/web-based services, and/or other external sites) that require user/login credentials for authentication to the external site use secure protocols (e.g., Secure Sockets Layer (SSL), HTTPS, and/or other secure/ encrypted protocols) to keep the password data private (e.g., the password data is not sent in the clear over the Internet, as it is encrypted using a secure protocol). As described herein, in accordance with various embodiments, techniques are disclosed for decrypting such sessions with external sites (e.g., using a security device, such as a firewall) in order to determine if a username and password are being communicated with an external site (e.g., un-obfuscated in a form value, and that value is frequently named 'password' or 'pass' and, for example, an HTML form attribute: input type="password" can be used as a primary indicator, and/or using various other techniques, such as further described herein).

For example, when a firewall decrypts an SSL or HTTPS session, a decoder for the web application identifies the login/password fields that are specific to that external site (e.g., or searches for 'login' and 'password' or a regular expression (regexp) pattern match for same, if an App-ID for the external site is not available), and then the firewall can perform a check of the value(s) that the user submitted to the external site against a blacklist (e.g., a cache of enterprise user credentials, leaked/compromised credentials/passwords, "weak" passwords, and/or other credentials of interest) in order to provide for credentials enforcement using the firewall. Based on the results, the firewall can perform various actions in response to determining that the check reveals that the credentials submission sent by the user matches an entry in the blacklist based on the policy (e.g., a firewall policy). Example responsive actions can include to log the network activity, alert the user that such credentials are not compliant with an enterprise policy and/or that the external site is an untrusted/unknown site and that any credentials associated with that site may be compromised, block the user from accessing the external site until different user/password credentials are created (e.g., injecting a block/continue page into the stream that the user would see), and/or various other actions as further described herein. For example, when a user Alice, who is an employee at ACME Company, attempts to submit a username and password on an external social networking, email, or collaboration-related web site using user credentials (e.g., a username and password) that fail to satisfy a user credentials policy of ACME Company (e.g., a requirement that Alice not reuse her enterprise username and/or password on an external site, and/or other/additional credentials related requirements), the firewall can then detect such and perform a responsive action (e.g., alert, log, block, notify Alice to select different user credentials, suggest different and/or more complex/ compliant password options to Alice to possibly select for her user credentials for that external site, and/or perform another or additional actions).

As another example, a source for the connection (e.g., user ID or address) can also be maintained in a user credentials cache of external sites and password hashes that the source has used for one or more external sites (e.g., such can be added to the blacklist, and stored/cached locally at the firewall device, and/or can be transformed for an efficient and secure store of user credentials, such as further described herein). Using such a user credentials cache, a firewall can determine if the user attempts to use the same login/password combination at different external sites and/or for enterprise/internal sites (e.g., external login/password combinations should not match any internal LDAP or other internal enterprise user credentials) and perform a responsive action. For example, when a user Bob, who is an employee at ACME Company, attempts to create a username and password on an external sales/CRM-related web site using user credentials (e.g., a username and password) that match (e.g., or are very similar to and/or not sufficiently different from) the user credentials that Bob uses for accessing computing/networking-related resources of ACME Company (e.g., Bob's enterprise credentials for a computer logon, e-mail, LDAP, VPN, and/or other related resources), then the firewall can detect such and perform a responsive action (e.g., alert, log, block, notify Bob to select different user credentials, and/or perform another or additional actions).

As yet another example, if user credentials are known or determined to have been compromised at an external site, an enterprise can use such a user credentials cache to perform a responsive action. For example, the enterprise can require and determine if an enterprise user attempts to authenticate with user credentials at that site, and then the firewall can block that enterprise user from accessing that external site and/or require that user to reset their user name/password credentials to be sufficiently different on any other external or internal sites (e.g., before any further access to any such sites is permitted), which can enforce a policy that such users not have/use or reuse any identical or similar user/ password credentials with that compromised external site. For example, if users Alice and Bob, who are each employees at ACME Company, had previously created an account with user credentials on an external site that has recently been compromised, then the firewall can block Alice and Bob from accessing that external site, require Alice and Bob to create new user credentials before allowing them to access that site, block Alice and Bob (and/or all enterprise users) from accessing that site (e.g., categorizing that site as untrusted/unsafe based on the known compromise of user credentials), and/or perform another action(s) (e.g., alert, log, block, and/or perform another or additional actions).

Overview of Techniques for an Efficient and Secure Store for Credentials Enforcement Using a Firewall Techniques for an efficient and secure user credential store for credentials enforcement using a firewall are also disclosed.

For example, the various techniques described herein can facilitate credentials enforcement of firewall policies to external sites that are generally not under the control of the enterprise using an efficient and secure store for credentials enforcement using a firewall.

In an example implementation, these techniques can include transforming enterprise user credentials into a bloom filter that can be used for implementing a firewall policy for credentials enforcement. As an example, the credentials enforcement using a firewall can be used to alert users behind the firewall if their currently used credentials (e.g., enterprise or other login credentials) have been added to a blacklist upon their next login attempt. As another example, the blacklist can be used for intrusion prevention via detecting invalid brute forced blacklisted credentials (e.g., including brute forcing for the corresponding username of a valid password (in some cases, such as in a phishing attack or publicly leaked password, the attacker may only have a list of passwords but not a valid username for the enterprise, so the attacker needs to find out the valid username pair), or vice versa).

In some embodiments, a system, process, and/or computer program product for an efficient and secure store for credentials enforcement using a firewall includes receiving a plurality of user credentials from an authentication server (e.g., from an agent executed on the authentication server); transforming the plurality of user credentials for storage at the network device; and storing the plurality of user credentials in a cache on the network device, in which network traffic is monitored at the network device to perform credentials enforcement based on one or more of the plurality of user credentials.

In an example implementation, the efficient and secure store for credentials enforcement using a firewall stores sensitive user login information that can then be used for filtering the network activity/traffic using a blacklist. For example, the blacklist can include/specify various credentials related data, such as the following: enterprise credentials (e.g., username and/or password), leaked passwords, custom blacklisted credentials (e.g., "weak" passwords), and/or other credentials related data of interest.

In one embodiment, the system, process, and/or computer program product for an efficient and secure store for credentials enforcement using a firewall further includes transforming the plurality of user credentials into space-efficient and secure data structure, such as a bloom filter; and storing the bloom filter on the network device (e.g., in a cache on the network device); monitoring network traffic at the network device to perform credentials enforcement using the bloom filter; and performing an action (e.g., a responsive action based on a firewall policy) if the match is determined.

In one embodiment, the system, process, and/or computer program product for an efficient and secure store for credentials enforcement using a firewall further includes transforming the plurality of user credentials into a bloom filter; monitoring network communications between a client and an external site; determining if the client sends a request that includes user credentials for authentication at the external site using the bloom filter; and performing an action in response to determining that the client sent the request that includes user credentials for authentication at the external site that match one or more of the plurality of user credentials stored at the network device.

Example responsive actions can block the session traffic if a violation of the firewall policy is determined, in which the firewall policy includes a policy for credentials enforcement used in the external site authentication; generating an alert if a violation of the firewall policy is determined, in which the firewall policy includes a policy for credentials enforcement used in the external site authentication; and/or logging the session traffic if a violation of the firewall policy is determined, in which the firewall policy includes a policy for credentials enforcement used in the external site authentication.

In one embodiment, the system, process, and/or computer program product for an efficient and secure store for credentials enforcement using a firewall further includes transforming the plurality of user credentials into a bloom filter; monitoring network communications between a client and an external site; determining if the client sends a request that includes user credentials for authentication at the external site; extracting a username and password from user credentials submitted in the request; determining if the username and password match one or more of the plurality of user credentials to perform credentials enforcement using the bloom filter; and if the username and password are determined to match one or more of the plurality of user credentials, then verifying whether the username and password match one or more of the plurality of user credentials by querying the authentication server using the username and password. In case of a credential from an authentication server is matched, in addition to the above mentioned block, alert, logging actions, example responsive actions can reset a user's password, enable additional authentication challenges, such as two-factor-authentication, account lock-out, and/or authentication source limitation (e.g., reject authentication attempts from all but trusted internal networks).

In some embodiments, the system, process, and/or computer program product for an efficient and secure store for credentials enforcement using a firewall includes receiving a space-efficient and secure data structure, such as bloom filter, from an agent executed on an authentication server, in which the bloom filter is generated by the agent based on a transformation of a plurality of user credentials extracted from the authentication server and/or intercepted at the authentication server; storing the bloom filter on the network device (e.g., in a cache on the network device); and monitoring network traffic at the network device to perform credentials enforcement using the bloom filter. For example, if a query of the bloom filter for an intercepted username and password from the monitored network traffic results in a match, then whether the intercepted username and password is an enterprise user credential can be verified by then querying the authentication server to check if the authentication server confirms that the intercepted username and password are enterprise credentials stored at the authentication server.

In one embodiment, the agent is executed on a full or partial replica of the authentication server (e.g., a replica that includes all or part of the credentials from the master authentication server). The agent can also be executed on a separate server/workstation and communicate with a master/slave/replica server via the network to obtain all or part of the credential data for the transform to a space-efficient and secure data structure, such as bloom filter. For example, a Read-Only Domain Controller (RODC) is an example of a partial replica that can be used to implement the above-described partial replica of the authentication server (e.g., this implementation can be used for customers that prefer to only share some of the credentials data for enforcement, and as such, can provide a replica with those allowed (subset of) their enterprise credentials data).

Accordingly, various techniques for providing credentials enforcement using a firewall and for providing an efficient and secure store for credentials enforcement using a firewall are disclosed. As will be apparent to one skilled in the art in view of the various techniques and embodiments described herein, the various techniques described herein for providing credentials enforcement using a firewall can similarly be applied to various network filtering that can be performed using cloud-based security solutions, host-based security solutions, and/or software-defined networking (SDN)-based security solutions, such as further described below with respect to various embodiments.

A System Architecture for Credentials Enforcement Using a Firewall

FIG. 1 is a functional diagram of an architecture of a network device that can be used for providing credentials enforcement using a firewall in accordance with some embodiments. As shown in FIG. 1, network traffic is monitored at a firewall 100. In one embodiment, network traffic is monitored using a data appliance (e.g., a data appliance that includes security functions, such as a security device/appliance that includes a firewall). In one embodiment, network traffic is monitored using a gateway (e.g., a gateway that includes security functions, such as a security gateway). In one embodiment, the network traffic is monitored using pass through (e.g., in-line) monitoring techniques.

In one embodiment, network traffic is monitored using a state-based firewall. In one embodiment, the state-based firewall can monitor traffic flows using an application (app)

identifier (ID) engine (e.g., shown as App ID Check & User ID Check 108 in FIG. 1). For example, the monitored network traffic can include HTTP traffic, HTTPS traffic, FTP traffic, SSL traffic, SSH traffic, DNS requests, unclassified application traffic (e.g., unknown application traffic), and/or other types of traffic (e.g., traffic using other types of known or unknown protocols).

As shown in FIG. 1, network traffic monitoring begins at 102. An IP address and port engine 104 determines an IP address and port number for a monitored traffic flow (e.g., a session) based on packet analysis. A policy check engine 106 determines whether any policies can be applied based on the IP address and port number. As also shown in FIG. 1, an App ID Check & User ID Check 108 identifies an application and a user. For example, the application can be identified using an APP-ID engine (108) using various application signatures for identifying applications based on packet flow analysis. The user identification can also be determined based on a source IP address. In this example, the APP-ID engine (108) can be configured to determine what type of traffic the session involves, such as HTTP traffic, HTTPS traffic, FTP traffic, SSL traffic, SSH traffic, DNS requests, unknown traffic, and various other types of traffic, and such classified traffic can be directed to an appropriate decoder, such as decoders 112, 114, and 116, to process the classified traffic for each monitored session's traffic flow. If the monitored traffic is encrypted (e.g., encrypted using HTTPS, SSL, SSH, or another known encryption protocol), then the monitored traffic can be decrypted using a decrypt engine 110 (e.g., applying trusted man-in-the-middle techniques using a self-signed certificate, such as further described below). A known protocol decoder engine 112 decodes and analyzes traffic flows using known protocols (e.g., applying various signatures for the known protocol) and reports the monitored traffic analysis to a report and enforce policy engine 120. Identified traffic (no decoding required) engine 114 reports the identified traffic to the report and enforce policy engine 120. An unknown protocol decoder engine 116 decodes and analyzes traffic flows (e.g., applying various heuristics) and reports the monitored traffic analysis to the report and enforce policy engine 120.

In one embodiment, the results of the various traffic monitoring techniques using known protocol decoder engine 112, identified traffic engine 114, and unknown protocol decoder engine 116 described above are provided to report and enforce policies engine 120 (e.g., network/routing policies, security policies, and/or firewall policies). For example, firewall policies can be applied to the monitored network traffic using application identification, user identification, and/or other information to match signatures (e.g., file-based, protocol-based, and/or other types/forms of signatures for detecting malware or suspicious behavior).

In one embodiment, firewall 100 also includes a content-ID engine (not shown). In one embodiment, the content-ID engine's identified content is also used by report and enforce policy engine 120, possibly in various combinations with other information, such as application, user, and/or other information, to enforce various security/firewall policies/rules.

In one embodiment, firewall 100 also includes a credentials blacklist matching component 118 and a credentials enforcement component 122 for providing credentials enforcement using the firewall (e.g., used in external site authentication), such as further described below. In one embodiment, credentials blacklist matching component 118 can perform operations for providing credentials enforcement using the firewall as similarly described herein, such as described below with respect to FIGS. 7, 8A-C, and 9-12. For example, decoded content of an authentication web page for an external website can be parsed to extract user credentials that can be compared to a credentials blacklist using credentials blacklist matching component 118. If there is a match with the credentials blacklist, then firewall 100 can determine a responsive action based on credentials enforcement policy 122.

In one embodiment, various other functional architectures and flows are provided to implement techniques for providing credentials enforcement using a firewall as described herein. For example, some of these functions can be implemented in software executed on a general processor and/or some of these functions can be implemented using hardware acceleration techniques for faster packet processing of network traffic, such as further described below.

A Network Architecture for Credentials Enforcement Using a Firewall

Figure 2:
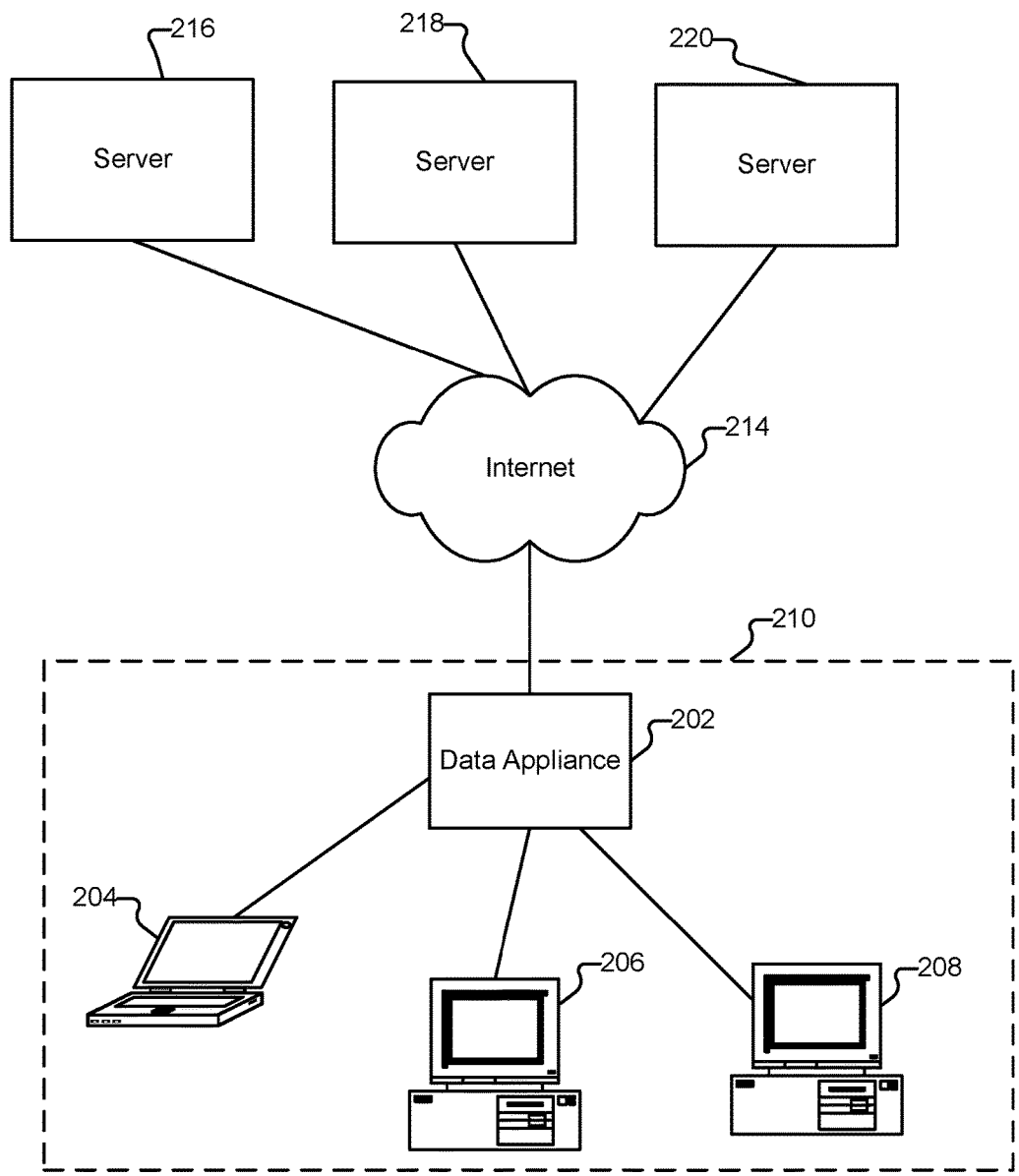
FIG. 2 is a block diagram of a network architecture that can be used for providing credentials enforcement using a firewall in accordance with some embodiments.

FIG. 2 is a block diagram of a network architecture that can be used for providing credentials enforcement using a firewall in accordance with some embodiments. As shown, a data appliance 202 (e.g., a network device that includes security functions, such as a security appliance/device that includes a firewall, a gateway that includes security functions, such as a security gateway, and/or any other network device that includes a firewall function as described herein) is at the perimeter of a protected network 210, which includes clients 204, 206, and 208.

In one embodiment, data appliance 202 includes a firewall component, such as firewall 100 as described above, to protect the network and clients within the protected network 210, which is in communication with the Internet 214 and various servers, such as servers 216, 218, and 220 (e.g., web servers, mail servers, file servers, and/or other types of servers).

Figure 3A:
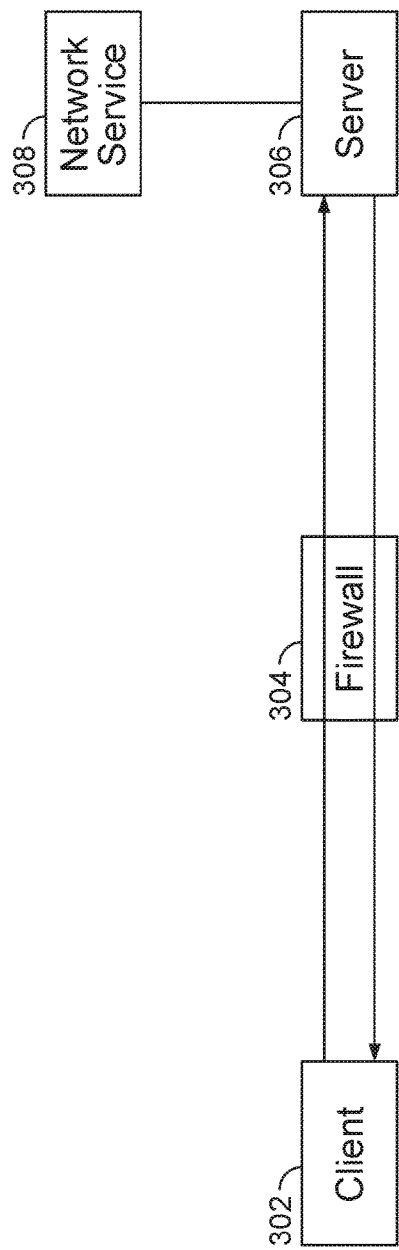
FIG. 3A is a functional block diagram illustrating a typical SSL session passing through a firewall.

Techniques for Decrypting Network Traffic for Credentials Enforcement Using a Firewall FIG. 3A is a functional block diagram illustrating a typical SSL session passing through a firewall. In that session, the firewall can only inspect the handshake traffic, as all the application data is encrypted. As shown, a client 302 establishes a secure tunnel session (e.g., creates an SSL tunnel) with a remote server 306. The client 302 can use the secure tunnel with the server 306 to access a network service 308, which can be a network service activity that is in violation of one or more firewall policies/rules implemented by the firewall device 304 (e.g., a policy that includes a credentials blacklist for credentials enforcement). However, because the secure tunnel session traffic is encrypted and passes through a firewall 304, the firewall 304 cannot decrypt the encrypted secure tunnel session traffic and, thus, cannot detect such firewall policy/rule violation(s).

Accordingly, various techniques for intercepting and decoding encrypted tunneling communications from a client to a remote server are disclosed herein. For example, a trusted man-in-the-middle technique that can be used for intercepting and decoding encrypted tunneling communications to monitor such traffic in the clear is described below with respect to FIG. 3B.

Figure 3B:
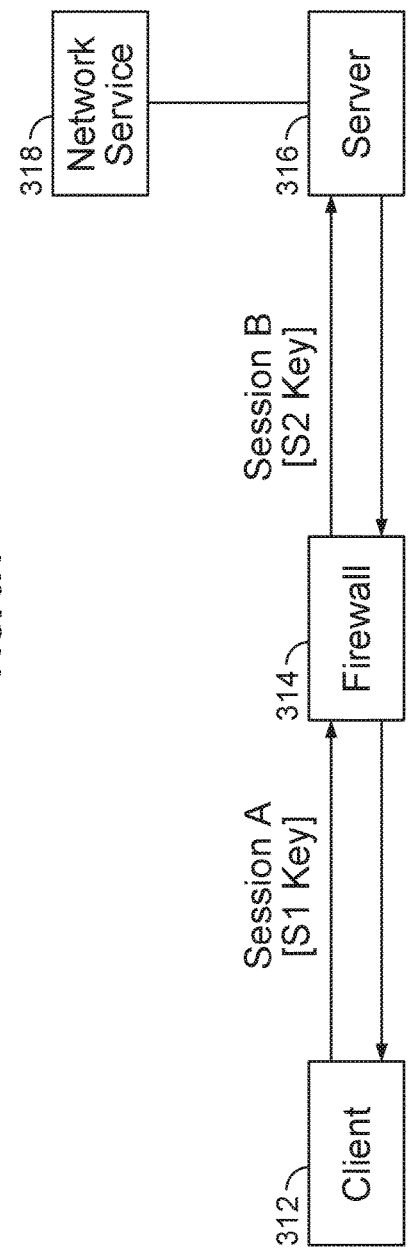
FIG. 3B is a functional block diagram illustrating the use of a firewall for providing credentials enforcement using a firewall in accordance with some embodiments.

FIG. 3B is a functional block diagram illustrating the use of a firewall for providing credentials enforcement using a firewall in accordance with some embodiments. As shown, a client 312 attempts to establish an SSL session with a remote server 316. The client 312 can attempt to use, for example, a secure tunnel with the server 316 to access a network service 318, which can be a network service activity that is in violation of one or more firewall policies/rules implemented by a firewall device 314. However, in this case, the SSL session request is intercepted and detected by the firewall 314. In response, the firewall 314 performs a trusted man-in-the-middle technique by effectively splitting the SSL session between the client 312 and the remote server 316 into two half sessions shown as Session A and Session B in FIG. 3B. In Session A, the firewall 314 acts as the remote server 316 such that it is transparent to the client 312 that it is not communicating directly with the remote server 316. Session A traffic is encrypted using the session key S1 associated with the firewall device. In Session B, the firewall 314 acts as the client 312 such that it is transparent to the remote server 316 that it is not communicating directly with the client 312. Session B traffic is encrypted using the session key S2 associated with the firewall device (e.g., the firewall device can store the fingerprint from the remote server in association with that remote server IP address). After the session set-up handshaking is completed for each of Session A and Session B, any data that is communicated from the client 312 to the firewall 314 is decrypted using a session key S1 and is then inspected by the firewall 314. If the client 312 requests a new channel to perform tunneling (e.g., create an SSL tunnel request), the firewall 314 can detect the request by the client 312 to establish an encrypted tunnel with the remote server 316. In response, the firewall 314 can perform various responsive actions. For example, the firewall 314 can deny (e.g., tear down) the entire session, the firewall 314 can send a not-supported response back to the client and avoid creation of the new tunnel (e.g., informing the client that the remote server does not support tunneling), the firewall 314 can mark the sessions as SSL-tunneling-traffic and continue to monitor the session traffic for firewall policy/rule compliance (e.g., for the life of the session, for a predetermined period of time, and/or until a predetermined event occurs), and/or the firewall 314 can perform other responsive actions or combinations of various responsive actions. In some cases, if the traffic is determined to be authorized SSL remote-access traffic, the firewall 314 encrypts the tunneled traffic using a session key S2 and forwards the encrypted traffic to the remote server 316. Similarly, traffic coming from the server is decrypted with the session key S2, inspected by the firewall 314, and then encrypted using the session key S1 and forwarded to the client 312.

Thus, using these techniques, the firewall 314 is between the client 312 and the server 316 and can present itself as server of the session to the client and can present itself as the client of the session to the server. In this manner, the firewall 314 can inspect decrypted traffic and re-encrypt it before forwarding it to the other party. During inspection, if encrypted tunneling traffic is detected, the entire session can either be torn down or various other responsive actions can be performed as described herein. As will be apparent to one skilled in the art in view of the various techniques and embodiments described herein, while the embodiments described above are described with reference to the SSL protocol, the various techniques described herein for providing credentials enforcement using a firewall can similarly be applied to other encrypted protocols that support tunneling.

Another Network Architecture for Credentials Enforcement Using a Firewall

Figure 4:
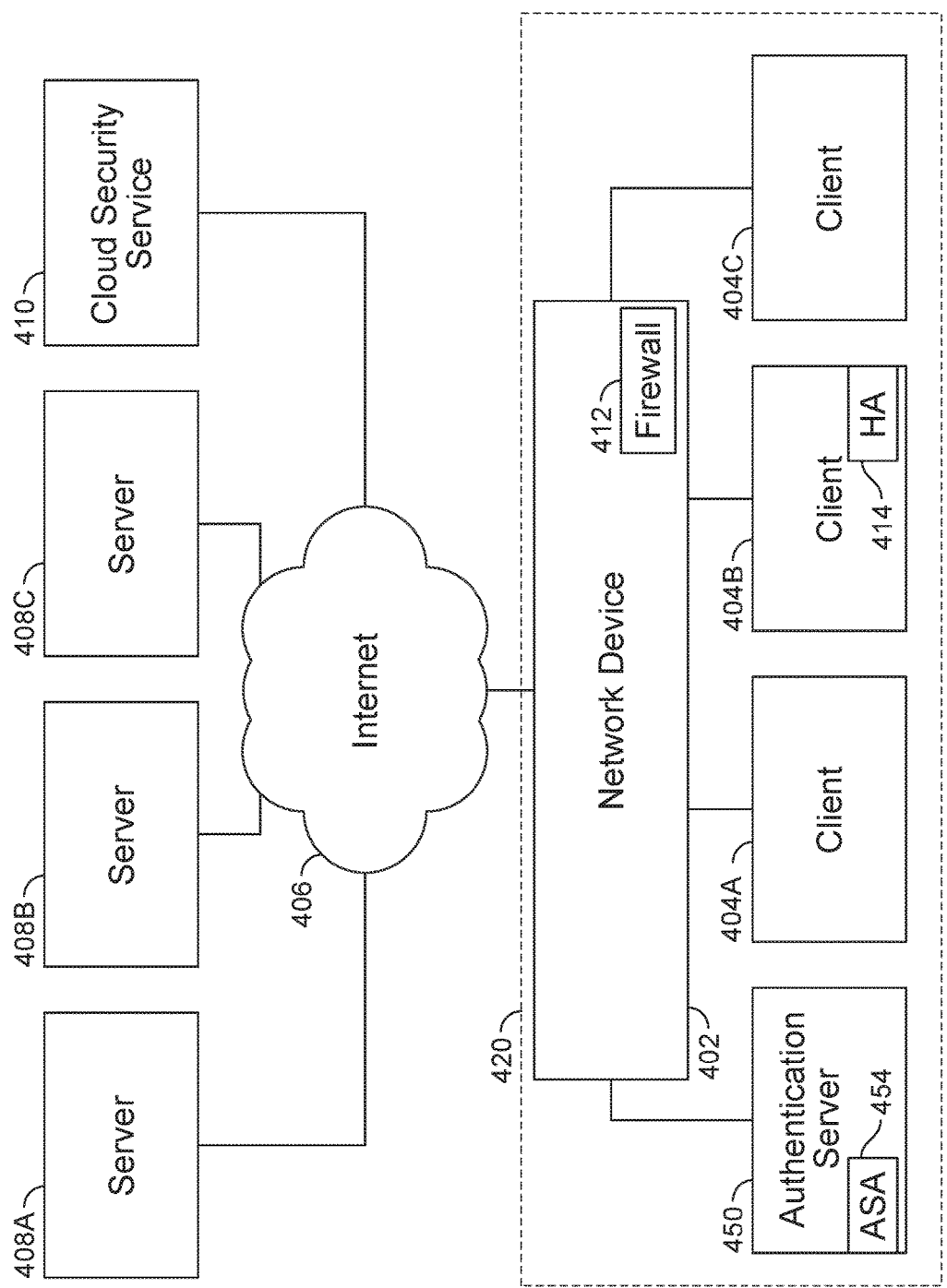
FIG. 4 is a block diagram illustrating another network architecture for providing credentials enforcement using a firewall in accordance with some embodiments.

FIG. 4 is a block diagram illustrating another network architecture for providing credentials enforcement using a firewall in accordance with some embodiments. As shown in FIG. 4, client devices 404A, 404B, and 404C are in communication with the Internet 406 via a network device 402 (e.g., a data appliance, such as similarly described above with respect to FIG. 2). In one embodiment, the network device 402 includes a firewall 412 as shown, which can be used for security for enterprise network 420. In one embodiment, the network device 402 includes a data appliance (e.g., a security appliance), a gateway (e.g., a security server), a server (e.g., a server that executes security software including firewall 412), and/or some other network/security device, which, for example, can be implemented using computing hardware, software, or various combinations thereof.

In one embodiment, one or more of the client devices 404A-404C include a host agent (HA) 414 as shown. For example, HA 414 can be implemented as a host-based firewall and/or an agent, such as a network/security agent, executed on the client/host device that can perform various functions in coordination with firewall 412 to facilitate endpoint protection and to facilitate the various techniques for providing credentials enforcement using a firewall, such as further described below. In an example implementation, HA 414 can be provided by a lightweight agent (e.g., a commercially available endpoint agent, such as the Palo Alto Networks® Traps™ agent available from Palo Alto Networks, Inc., which is a highly scalable, lightweight agent for endpoint security) that can be executed on, for example, a variety of different client/host device platforms (e.g., Microsoft® Windows® OS platforms for clients and/or servers) to facilitate endpoint security in coordination with firewall 412, such as further described below.

Some sites may encode, hash, or otherwise obfuscate some or all POST data on the client. With a HA (e.g., HA 414) detecting obfuscation techniques, an un-obfuscated analysis can be performed or a policy can be enforced to implement the disclosed techniques.

In one embodiment, firewall 412 and/or HA 414 perform some or all of the functions described above with respect to FIGS. 1 and 3B. For example, client devices 404A-C can include various computing devices that can access the Internet via wired and/or wireless communications, such as computers, laptops, tablets, smart phones, and/or various other types of computing devices with network communication capabilities. As also shown, servers 408A-C are in communication with the Internet 406. For example, a client device can access a service provided by a server via the Internet, such as a web-related service (e.g., web site, cloud-based services, streaming services, or email service), peer-to-peer related service (e.g., file sharing), IRC service (e.g., chat service), and/or any other service that can be delivered via the Internet.

In one embodiment, when a HA (e.g., HA 414) is available on a host, client-side inspection and username/password extraction can be performed more reliably and inexpensively on the HA (e.g., than may be possible on a firewall_, as it can be performed before any application, web-based, Java-Script-based, plugin-based or browser-based obfuscation and encryption are applied. Also, the HA can afford more extensive content inspection and state keeping than a firewall could (e.g., using machine learning techniques, guided by periodic content updates from cloud security updates, to heuristically identify phishing or malicious web pages and/or extraction of information for additional inspections and responsive actions). In one example, assuming an HA (e.g., HA 414) is executed on a particular host as similarly described above, the firewall (e.g., firewall 412) can implement a policy (e.g., firewall policy) to treat traffic already inspected by the HA from that host as having a lower security risk and only inspects it opportunistically (e.g., based on available firewall/network device resources and/or other parameters). In some cases, the firewall can also use HA provided credentials, summary data, and/or verdicts to pre-clear sessions instead of waiting for traffic to arrive and perform expensive traffic stream decoding, analysis, and credential extraction.

As also shown in FIG. 4, enterprise network 420 includes an authentication server 450. Authentication server 450 verifies user credentials (e.g., username and password) to authorize users access to enterprise network 420 (e.g., one or more network/computing resources on the enterprise network). In an example implementation, authentication server 450 can maintain a Microsoft® Active Directory (AD) or other Lightweight Directory Access Protocol (LDAP) directory service (e.g., other authorization/directory services can similarly be implemented by authentication server 450) that includes user credentials (e.g., user, group, and/or system accounts). As an example, when a user logs into their Microsoft Windows account on one of the client devices 404A-C, then the user credentials can be verified using authentication server 450 to authorize access, such as facilitating Single Sign-On (SSO), to other servers/systems on enterprise network 420 based on the authorized user's account.

In one embodiment, authentication server 450 includes an authentication server agent (ASA) 454 as shown in FIG. 4. For example, ASA 454 can be implemented using a host-based agent, such as a network/security agent, executed on the authentication server that can perform various functions in coordination with firewall 412 to facilitate techniques for an efficient and secure store for credentials enforcement using the firewall, such as further described below. In an example implementation, ASA 454 can be implemented using a highly scalable, lightweight agent that can be executed on the authentication server and can be configured to securely extract and/or intercept enterprise user credentials at the authentication server, and to communicate the enterprise user credentials to network device 402/firewall 412 (e.g., via a secure communication channel, such as using a secure network protocol, such as via a VPN/SSL communication connection) for performing the disclosed techniques as further described below. In another example implementation, ASA 454 can be implemented using a highly scalable, lightweight agent that can be executed on the authentication server and can be configured to securely transform enterprise user credentials extracted from the authentication server (e.g., to generate a bloom filter and/or other transformation of the extracted enterprise user credentials into a secure storage format), and to communicate the transformed enterprise user credentials to network device 402/firewall 412 (e.g., via a secure communication channel, such as using a secure network protocol, such as via a VPN/SSL communication connection) for performing the disclosed techniques as further described below. As further described below, ASA 454 can be performed to implement various other techniques to facilitate credentials enforcement using the firewall.

As will now be apparent, some or all of the functions described above with respect to FIGS. 1 and 3B can be assisted by or implemented in whole or in part by a cloud security service 410. Cloud security service 410 can, for example, reduce the processing on the network device 402. As another example, detection of firewall policy violations and/or vulnerabilities based on credentials enforcement using a firewall can be reported to cloud security service 410 by network device 402. In an example implementation, the enterprise network is subscribed to the cloud security service, and the network device can securely communicate with the cloud security service (e.g., using a commercially available cloud-based security service, such as provided by Palo Alto Networks® that provides API support via the WildFire API, such as for submission of files or PCAPs or other content for malware analysis). Another example is using a URL filtering subscription service (e.g., Palo Alto Networks PANdb URL filtering subscription service or another commercially available URL filtering subscription service) to submit one or more URLs (e.g., the submission of URL, full or part of a web page, statistics/transformed version of a webpage, which can include a list of form field names, types, default values, parameters, etc.) for cloud-based, asynchronous analysis. The results of the cloud-based, asynchronous analysis can then be provided back to the firewall and/or other network/filtering devices for possible responsive actions.

Figure 5:
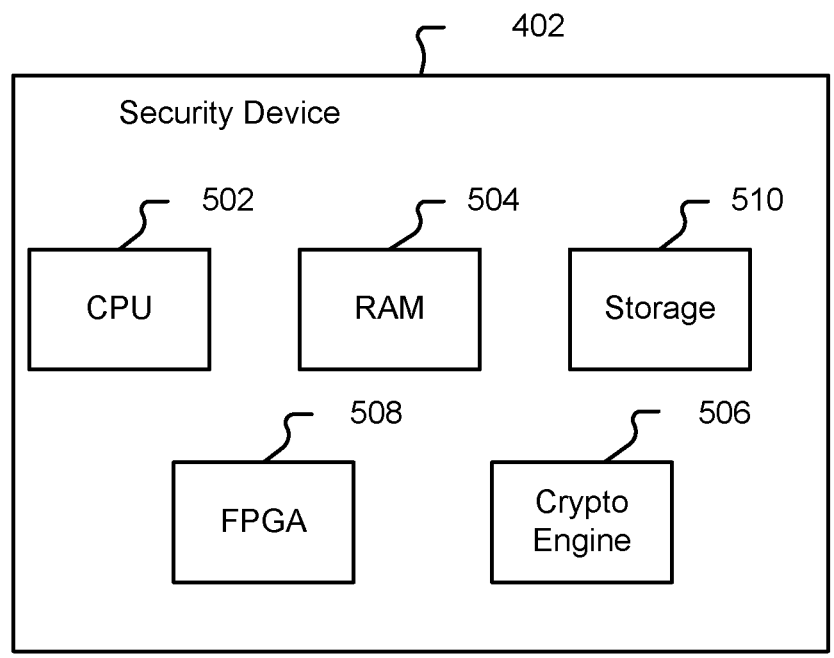
FIG. 5 is a functional diagram of hardware components of a network device for providing credentials enforcement using a firewall in accordance with some embodiments.

Hardware Components of a Network Device for Credentials Enforcement Using a Firewall FIG. 5 is a functional diagram of hardware components of a network device for providing credentials enforcement using a firewall in accordance with some embodiments. The example shown is a representation of physical/hardware components that can be included in network device 402 (e.g., an appliance, gateway, or server). Specifically, network device 402 includes a high performance multi-core CPU 502 and RAM 504. Network device 402 also includes a storage 510 (e.g., one or more hard disks or solid state storage units), which can be used to store policy and other configuration information as well as signatures. In one embodiment, storage 510 stores tables that include host names/identifiers (e.g., URLs) and associated IP addresses and possibly other information for clients and/or remote servers identified as external sites that are monitored for providing credentials enforcement using a firewall. In one embodiment, storage 510 stores a user credentials cache that includes usernames and/or passwords for enterprise users on an enterprise network (e.g., a plaintext store of user credentials, a hash of the password data can be stored, such as using an MD5 hash or another hash algorithm, and/or a bloom filter generated based on the user credentials, and/or other credentials related data that can be stored in various formats using various techniques such as described herein) received from an enterprise authentication directory (AD) (e.g., Directory Service (DS) or Domain Controller (DC), in which an agent can be executed on the AD/DS/DC to facilitate the disclosed techniques for interacting with the AD/DS/DC (hereinafter, referred to generally as AD)), such as server read only domain controller or other AD server for the enterprise network (e.g., enterprise network 210 as shown in FIG. 2 or enterprise network 420 as shown in FIG. 4), such as further described below. Network device 402 can also include one or more optional hardware accelerators. For example, network device 402 can include a cryptographic engine 506 configured to perform encryption and decryption operations, and one or more FPGAs 508 configured to perform signature matching, act as network processors, and/or perform other tasks.

Figure 6:
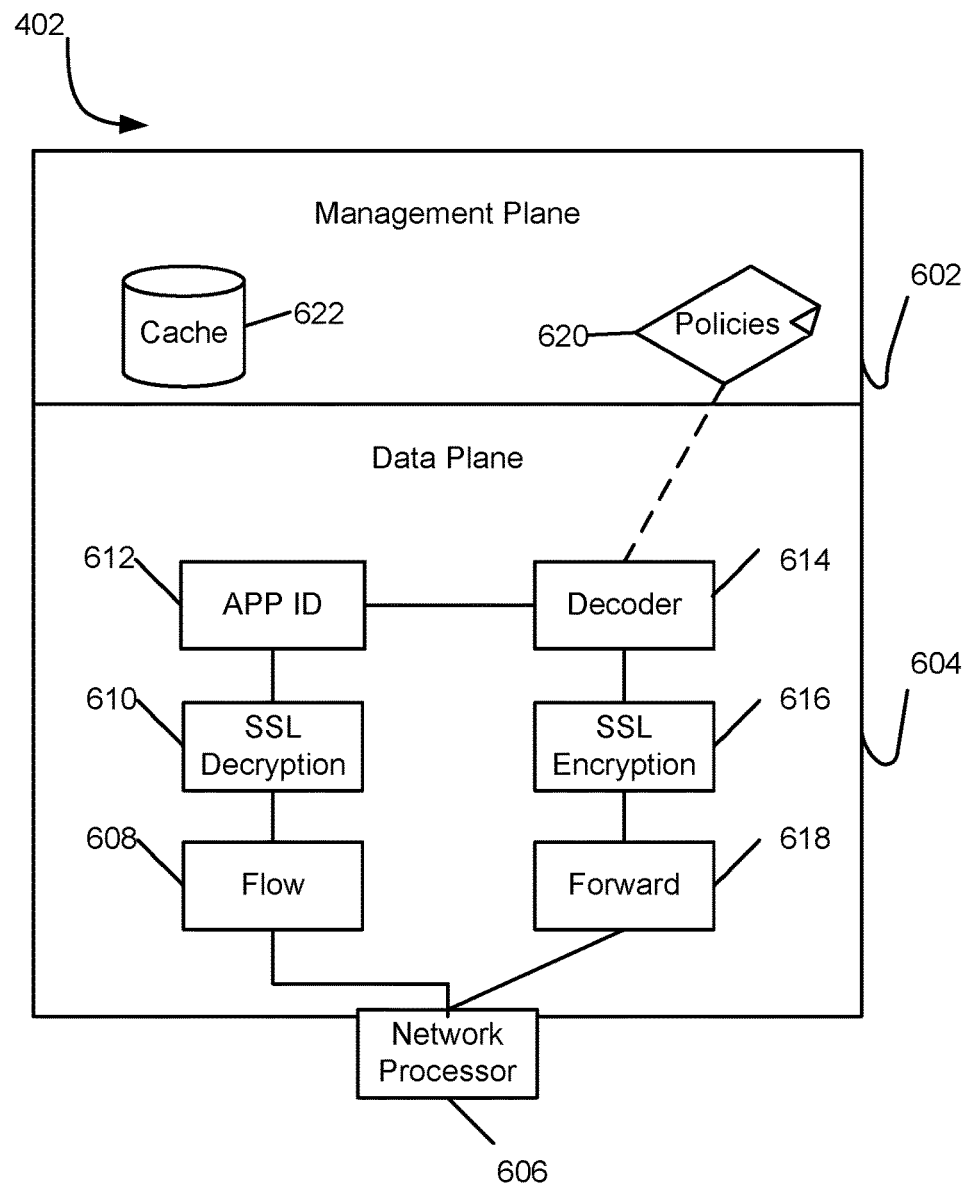
FIG. 6 is a functional diagram of logical components of a network device for providing credentials enforcement using a firewall in accordance with some embodiments.

Logical Components of a Network Device for Credentials Enforcement Using a Firewall FIG. 6 is a functional diagram of logical components of a network device for providing credentials enforcement using a firewall in accordance with some embodiments. The example shown is a representation of logical components that can be included in network device 402. As shown, network device 402 includes a management plane 602 and a data plane 604. In one embodiment, the management plane is responsible for managing user interactions, such as by providing a user interface for configuring policies and viewing log data. The data plane is responsible for managing data, such as by performing packet processing and session handling.

Suppose a client 404A attempts to access a server 408B using an encrypted session protocol, such as SSL. Network processor 606 is configured to receive packets from client 404A, and provide the packets to data plane 604 for processing. Flow 608 identifies the packets as being part of a new session and creates a new session flow. Subsequent packets will be identified as belonging to the session based on a flow lookup. If applicable, SSL decryption is applied by SSL decryption engine 610 (e.g., as similarly described above with respect to decrypt component 110 of FIG. 1) using various techniques as described herein. Otherwise, processing by SSL decryption engine 610 is omitted. Application identification (APP ID) module 612 is configured to determine what type of traffic the session involves and to identify a user associated with the traffic flow (e.g., as similarly described above with respect to App ID and User ID check component 108 of FIG. 1). For example, APP ID 612 can recognize a GET request in the received data and conclude that the session requires an HTTP decoder. For each type of protocol, there exists a corresponding decoder 614 (e.g., as similarly described above with respect to network traffic processing components 112, 114, and 116 of FIG. 1). In one embodiment, the application identification is performed by an application identification module (e.g., APP-ID engine), and a user identification is performed by another function/engine. Based on the determination made by APP ID 612, the packets are sent to an appropriate decoder 614. Decoder 614 is configured to assemble packets (e.g., which may be received out of order) into the correct order, perform tokenization, and extract out information (e.g., to extract URLs and/or to identify and extract username/password credentials being submitted to an external site for user authentication). Decoder 614 also performs signature matching to determine what should happen to the packet. SSL encryption engine 616 performs SSL encryption using various techniques as described herein. As also shown, policies 620 are received and stored in the management plane 602. In one embodiment, policy enforcement (e.g., policies can include one or more rules, which can be specified using domain and/or host/server names, and rules can apply one or more signatures or other matching criteria or heuristics, such as for providing credentials enforcement as disclosed herein) is applied as described herein with respect to various embodiments based on the monitored, decrypted, identified, and decoded session traffic flows.

As also shown in FIG. 6, a cache 622 (e.g., a credentials cache) is also provided for maintaining user credentials that can be used to implement the disclosed techniques for credentials enforcement as will be further described below. As will be further described below with respect to FIG. 7, the credentials cache can be maintained in the management plane and/or the data plane of the security device.

Figure 7:
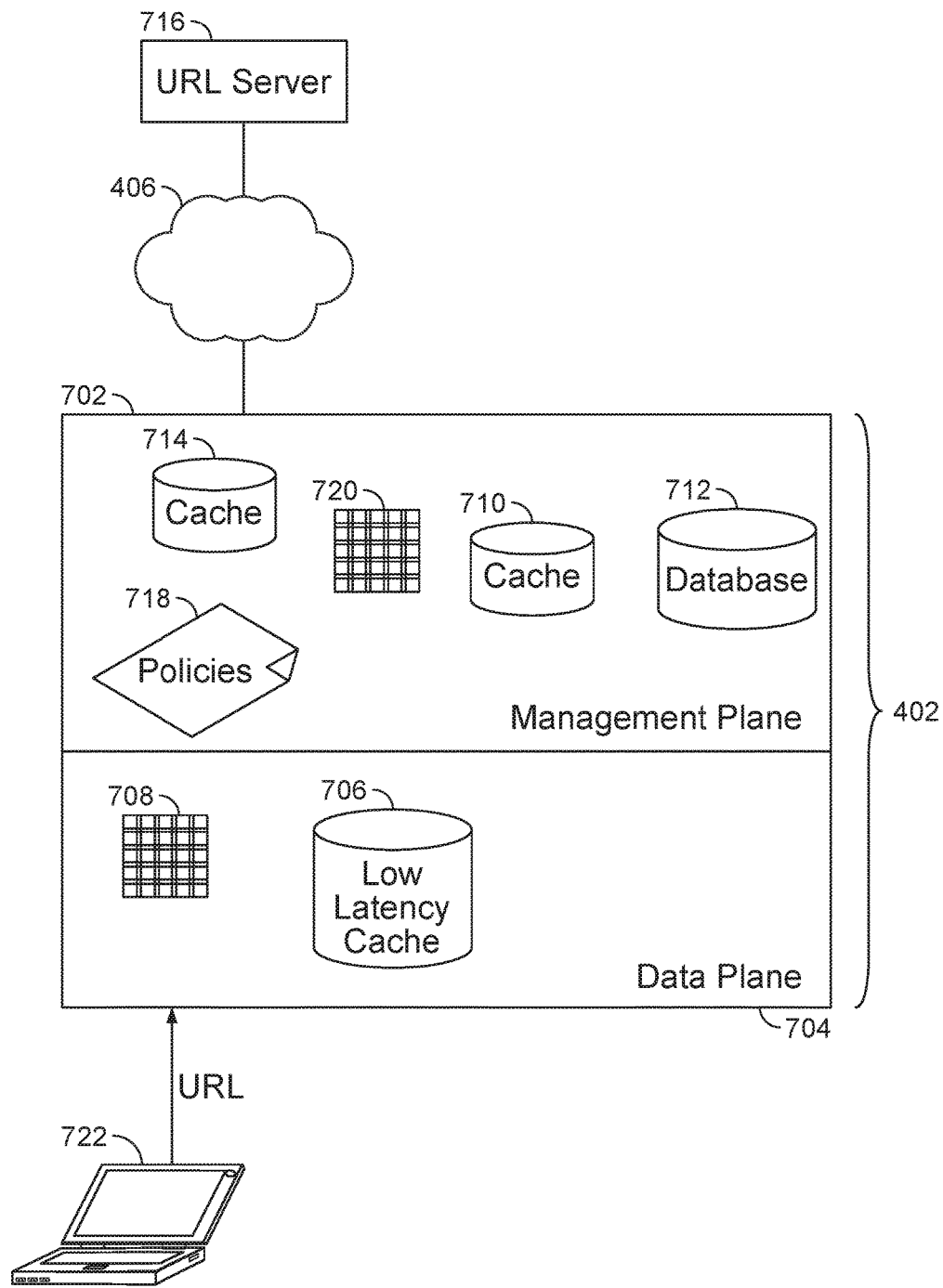
FIG. 7 is another functional diagram of logical components of a network device for providing credentials enforcement using a firewall in accordance with some embodiments.

Components of a Network Device including an Efficient and Secure Store for Credentials Enforcement Using a Firewall FIG. 7 is another functional diagram of logical components of a network device for providing credentials enforcement using a firewall in accordance with some embodiments. In the example shown, the functionality of network device (e.g., policy enforcement appliance) 402 is implemented in a firewall. Specifically, network device 402 includes a management plane 702 and a data plane 704. The management plane is responsible for managing user interactions, such as by providing a user interface for configuring policies 718 and viewing log data. The data plane is responsible for managing data, such as by performing packet processing (e.g., to extract URLs and/or user credentials) and session handling. In various embodiments, a scheduler is responsible for managing the scheduling of requests (e.g., as presented by data plane 704 to management plane 702, or as presented by management plane 702 to URL server 716 via Internet 406).

One task performed by the firewall is URL filtering. Suppose network 420 belongs to a company, ACME Corporation. Specified in security device 402 are a set of policies 718, some of which govern the types of web sites that employees may access, and under what conditions. In some cases, based on a firewall policy, certain unknown and/or untrusted sites may be blocked and/or monitored for use of enterprise user credentials for external site authentication. In other cases, based on a firewall policy, all sites may be monitored for use of enterprise user credentials for external site authentication. As one example, included in the firewall is a policy that permits employees to access certain web-based email, cloud-based storage web sites, and/or other types of external sites (e.g., known and/or trusted external sites). Another policy included in the firewall prohibits, at all times, employees from accessing certain web sites that are unknown or untrusted (e.g., externals sites that have been classified as having inadequate/insecure authentication protocols or are known to have suffered user credential data compromises/thefts can be deemed untrusted). Also included in the firewall is a database 712 of URLs and associated categories. Other information can also be associated with the URLs in the database instead of or in addition to category information, and that other information can be used in conjunction with policy enforcement. In one embodiment, the database is provided by a third party, such as through a subscription service. In one embodiment, a subset of the contents of database 712 (e.g., URLs/categories/other information associated with a certain set of the most commonly visited URLs/external sites) is cached in a cache 714 for more efficient comparisons/look-ups performed by network device 402.

In one embodiment, a cache 710 (e.g., a credentials cache) is also provided for maintaining user credentials that can be used to implement the disclosed techniques for credentials enforcement as will be further described below. For example, the credentials cache can be provided using cache 710 in management plane 702 of security device 402 as shown in FIG. 7. In an example implementation, the caches stored in the management plane and the data plane can be designed to use different transform parameters, data structures, and/or techniques (e.g., hash functions, number of hashes, cache size, counting versus bitmap-based membership query, or storing both username and password, or only the password, etc.). This approach can be used for a variety of reasons, such as to make the two caches complement each other for lower false positive rates and/or reducing or eliminating the need for external authentication server checks (e.g., LDAP); the management plane generally can use more memory and perform more computations based on the hardware configuration of the network device; and the management plane may be utilized to perform more expensive transformations for incremental updates (e.g., a counting bloom filter instead of traditional bit-map bloom filter), which can be more efficiently performed using the management plane based on the hardware configuration of the network device.

As another example, the credentials cache can be provided using a low latency cache 706 (e.g., a low latency cache that can facilitate efficient/fast look-ups/comparisons to detect user credential matches associated with monitored network activity using the disclosed techniques) in data plane 704 of network device 402 as also shown in FIG. 7. In an example implementation, the credentials cache is implemented using a cache that can include usernames and/or passwords (e.g., an email address can also be a field of interest as such can also be used as a username in many cases). In some cases, the credentials (e.g., usernames and/or passwords) are stored in the clear/plaintext on the network device (e.g., not hashed, not encrypted, and not otherwise obfuscated). In other cases, the credentials (e.g., usernames and/or passwords) are securely stored on the network device (e.g., the credentials can be hashed, encrypted, and/or otherwise obfuscated to securely store the credentials data on the security device).

As an example use case, when a user of client 722 (an employee referred to herein as "Alice") attempts to engage in activities such as web surfing, communications from and to the client pass through network device 402. As one example, suppose Alice has launched a web browser application on client 722 and would like to visit an arbitrary web page. Network device 402 is configured to evaluate the URL of the site (e.g., external site) that Alice would like to visit and determine whether access to that external site should be permitted. In some cases, network device 402 similarly performs a URL pre-filtering stage to determine whether to apply credentials enforcement. For example, assuming that the URL is unknown and/or untrusted, then a policy (e.g., a firewall policy) may allow access to that external site but may also require that network device 402 further monitors network traffic activity during Alice's session with the external site to determine whether Alice submits user credentials for external site authentication. If so (e.g., user credentials are identified and extracted in a request submitted from Alice's session with the external site), then the submitted user credentials can be compared with enterprise user credentials (e.g., cached enterprise user credentials) to determine whether the submitted user credentials match any enterprise user credentials (e.g., enterprise user credentials associated with Alice's user ID for the enterprise/ACME Corporation). In an example implementation, a cache of commonly queried URLs that are in the URL database can be used and/or a bloom filter can be generated for (a subset) of the URLs in the URL database (e.g., for commonly queried URLs) to efficiently match URLs to perform such URL filtering using the network device. In other cases, a URL pre-filtering stage is not performed or required prior to performing the disclosed credentials enforcement techniques using a firewall, in which case such techniques are performed during any session with an external site.

In one embodiment, the credentials (e.g., user credentials, which can include usernames and/or passwords) are transformed into another format for storage on the security device. In such a scenario, it is possible that instead of the user credentials being stored in the clear/plaintext in, for example, cache 710 and/or low latency cache 706, a transformation is applied to the user credentials prior to storage for securely storing the user credentials as will be further described below. As one example, MD5 hashes of usernames and/or passwords can be stored in cache 710 and/or low latency cache 706, rather than the usernames and/or passwords themselves. These and other examples for securely storing the user credentials will be further described below. In one embodiment, the user credentials stored in cache 710 and/or low latency cache 706 (or transformations thereof) correspond to enterprise user credentials associated with authorized enterprise users on the enterprise network (e.g., enterprise user credentials for enterprise network 420), which can be (periodically) collected and/or verified using various techniques as will be further described below.

In one embodiment, a transformation is applied to the credentials prior to storage for securely storing the user credentials on the network device. For example, the credentials (e.g., usernames and/or passwords) can be securely stored using various techniques. For example, a hash of the credentials data (e.g., usernames and/or passwords) can be stored, such as using an MD5 hash or another hash algorithm (e.g., rather than storing the usernames and/or passwords themselves, in the clear/plaintext). As another example, the credentials (e.g., usernames and/or passwords) can be encrypted using various well known encryption algorithms (e.g., user credentials data can be encrypted at rest while in the cache(s), which can facilitate security for the sensitive user credentials data when stored/cached on the network device, but such will also generally be slower for performing comparisons as such will require decrypting the user credentials data in order to perform such comparisons to verify potential user credentials related activity being monitored by the network device). As yet another example, the credentials (e.g., usernames and/or passwords) data can be obfuscated using various well known obfuscation algorithms.

In one embodiment, the credentials are transformed into a bloom filter 708 for storage on the security device. For example, credentials data can be transformed into one or more bloom filters prior to storage for securely storing the user credentials on the network device. The bloom filter(s) can provide an efficient and secure credentials data store for performing the disclosed techniques for providing credentials enforcement using a firewall. Referring to FIG. 7, bloom filter 708 is located in data plane 704 of security device 402 to facilitate efficient implementation of the disclosed techniques for providing credentials enforcement using a firewall. In an example implementation, bloom filter 708 is compiled from the collected/extracted/received credentials data (e.g., enterprise user credentials) and is loaded into memory (e.g., RAM 504 as shown in FIG. 5). In one embodiment, the bloom filter is compiled as a bitmask. Whenever there are changes to the credentials data (e.g., enterprise credentials data can be periodically collected or received (such as by registering the agent with the AD/LDAP to request pushed updates, which can be used instead of or in addition to periodic polling) from an enterprise authentication directory, such as an AD/LDAP server or other authentication server), bloom filter 708 can be recompiled/regenerated. As an example, the credentials related data (e.g., passwords, or usernames and passwords) can be hashed using the same or multiple hash functions (e.g., MD5, SHA-1, and/or other hash functions can be applied), the same hash function with different salts, and, in different implementations, just a subset of bits or all bits (e.g., 80 characters) can be hashed.

In one embodiment, bloom filter 708 is generated/compiled at network device 402. In one embodiment, the bloom filter is generated/compiled at the authentication server using an agent executed on the authentication server, and then the bloom filter is sent to the network device for storing at 708. In an example implementation, the generating/compiling of the bloom filter(s) can be implemented to ensure securing sensitive data during such processing, and securely deleting of such data (e.g., using well known secure wipe/erase techniques) after completion of the bloom filter(s) construction.

In one embodiment, a counting bloom filter 720 can additionally be used to more efficiently update (e.g., add or delete entries in) the bloom filter based on credentials data updates without having to recompile/regenerate the bloom filter. For example, a counting bloom filter can provide a way to implement a delete operation on a bloom filter without having to regenerate the filter each time when adding and/or deleting to the bloom filter (e.g., which can facilitate handling of potential enterprise credentials, which may likely be updated periodically as new users are added, certain users are removed, and/or users change their enterprise user credentials, etc.). In an example implementation, if updates to the credentials related data are collected/extracted/received, then counting bloom filter 720 can be updated locally in management plane 702 of network device 402, and then management plane 702 can convert counting bloom filter 720 to bloom filter 708 (e.g., a binary bloom filter) for caching/storing in data plane 704 of network device 402.

In one embodiment, a desired false positive rate of the bloom filter is configurable and, in some cases, is set at 1%, meaning that an ACCEPT response indicates, with 99% confidence, that the credential (e.g., username and/or password being queried for a match with the bloom filter) is present in the enterprise user credentials data used to generate/compile the bloom filter. The various techniques for collecting enterprise user credentials and generating the bloom filter(s) for implementing these techniques for providing credentials enforcement using a firewall will be further described below.

In one embodiment, an agent, such as shown as ASA 454 in FIG. 4, is deployed to an authentication server (e.g., AD/LDAP server) of the protected enterprise network (e.g., authentication server 450 of enterprise network 420 as shown in FIG. 4). For example, the agent can be in communication (e.g., secure communication) with the network device/firewall. In this example, the agent can be configured to extract enterprise user credentials (e.g., password hashes and/or usernames and password hashes) and to generate the bloom filter based on the enterprise user credentials securely stored on the authentication server, and then send the bloom filter to the network device (e.g., using a secure communication) for storing/caching on the network device. As a result, this approach does not involve exporting enterprise user credentials from the authentication server prior to transforming the enterprise user credentials into a bloom filter, in which the bloom filter can be used to provide an efficient and secure store for credentials enforcement using a firewall. In this example, the agent can also be configured to update the bloom filter when the authentication server's locally maintained enterprise credentials are updated/changed, and then send the updated bloom filter to network device 402. In an example implementation, the agent can also be configured to securely erase any temporary storage of such extracted user credentials from any storage medium/device of the authentication server. In another example implementation, the agent can also facilitate enterprise credentials verification by receiving a username and password from network device 402 and verifying whether such matches any of its locally maintained enterprise credentials.

In one embodiment, network device 402 can perform a Denial of Service (DoS)/brute force attack detection using a maximum (max) authentication (Authd) or rate limit counter (e.g., rate limiting counter can be cached/stored in data plane 704). For example, based on source IP (e.g., or per firewall, per user, and per source IP), network device 402 can be configured to automatically block such a potential DoS/brute force attack detection using the max Authd/rate limit counter (e.g., so that an attacker cannot use a compromised/stolen password list for a brute force attack on the enterprise network protected by network device 402).

In another embodiment, an agent, such as shown as ASA 454 in FIG. 4, is deployed to an authentication server (e.g., AD/LDAP server) of the protected enterprise network (e.g., authentication server 450 of enterprise network 420 as shown in FIG. 4). For example, the agent can be in communication (e.g., secure communication) with the network device/firewall. In this example, the agent can be configured to intercept a set-up of new enterprise user credentials or change to existing enterprise user credentials. As such, this can provide a process by which network device 402 can obtain enterprise user credentials for performing credentials enforcement using a firewall as described herein.

In another embodiment, network device 402 can intercept a set-up of new enterprise user credentials or change to existing enterprise user credentials using man-in-the-middle techniques as similarly described above with respect to FIG. 3B. As such, this can provide a process by which network device 402 can obtain enterprise user credentials for performing credentials enforcement using a firewall as described herein.

Accordingly, using various of the above-described disclosed techniques for a secure credentials store, the enterprise credentials (e.g., including, for example, a user ID and NTLM hash for each user credential extracted from an AD server) can be stored using a bloom filter on the network device/firewall so that not even the NTLM hashes of such enterprise passwords are accessible (e.g., the NTLM hashes are transformed into the bloom filter and, thus, not stored in the clear). As such, this technique can be desirable for providing a secure credentials store for performing credentials enforcement using a firewall (e.g., otherwise, the network device may become another target for attacks to obtain such enterprise user credentials). In addition, such techniques can be desirable for providing an efficient credentials store for performing credentials enforcement using a firewall, as fast/efficient lookups can then be performed using the bloom filter, which is faster and not limited, unlike lookups to an AD/LDAP server (e.g., querying an AD/LDAP server each time to perform the initial lookup would not be efficient with the latency time of such operations, and such AD/LDAP lookups are typically limited, such as to avoid DoS attacks and/or for other reasons). As discussed above, because there are false positives on hits (but not misses) in a bloom filter hit/match, when such a hit/match is returned from the bloom filter, the disclosed techniques can include then verifying such a bloom filter hit/match by then querying an AD/LDAP server, which can greatly reduce the number of such AD/LDAP server queries that will be performed from the network device/firewall (e.g., assuming a low false positive rate for the bloom filter, such as 0.5% or 1%).

As shown, included in the network device/firewall are various caches 706, 710, and 714, which can also be loaded into memory (e.g., RAM 504 as shown in FIG. 5). In one embodiment, all or some of caches 706, 710, and 714 are omitted from network device 402 and the processing described herein is adapted accordingly. Additional detail of how components/elements 708, 710, 712, and/or 720 are used to process URLs and credentials is provided below with reference to FIGS. 8A-8C.

Figure 8A:
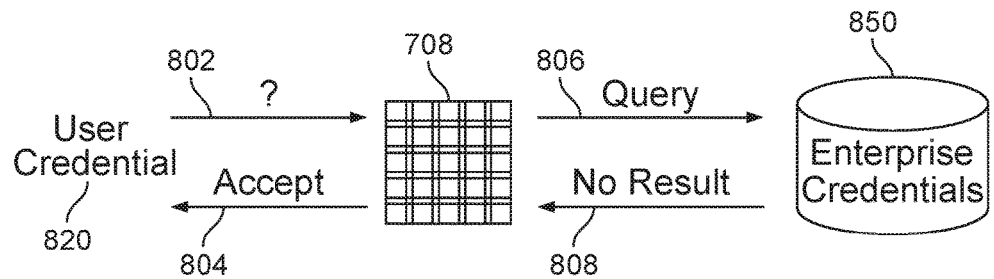
FIGS. 8A-8C illustrate representations of credentials enforcement processing performed by a network device using a bloom filter in accordance with some embodiments.
Figure 8B:
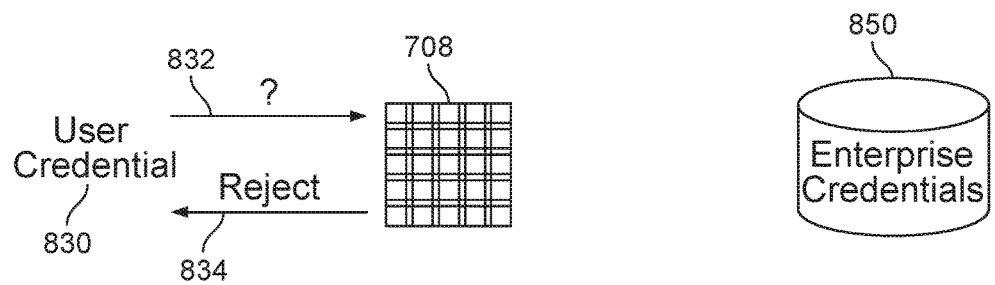
Figure 8C:
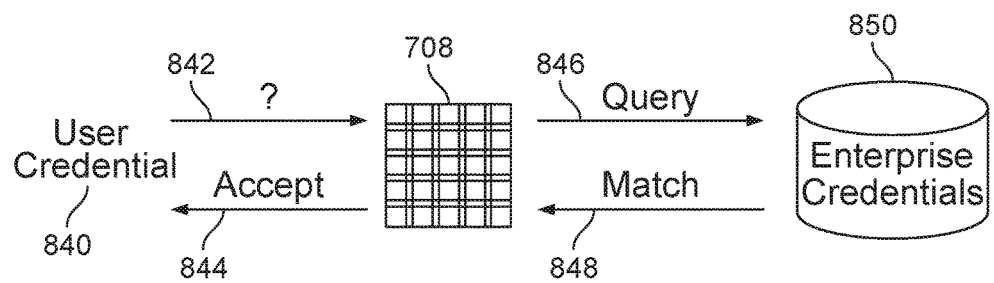

Techniques for Performing Credentials Enforcement Using an Efficient and Secure Store for Credentials Enforcement Using a Firewall FIGS. 8A-8C illustrate representations of credentials enforcement processing performed by a network device using a bloom filter in accordance with some embodiments. In the examples shown, assume that a session is being monitored by the firewall to identify and extract any user credentials submitted by a user to an external site for authentication to perform credentials enforcement using the firewall (e.g., the session may have been selected for credentials enforcement based on a URL pre-filtering stage as discussed above, based on a user ID associated with a given session, or such may be performed by the firewall for all sessions, and/or based on other criteria, such as user ID, traffic stream content and state analysis, or combinations thereof based on a policy associated with the firewall). In addition, assume that user credential 840 is an enterprise user credential (i.e., an MD5 hash of user credential 840 is present), while user credentials 820 and 830 are not. Further, assume that bloom filter 708 (e.g., this comparison can similarly be performed against bloom filter 720) will indicate a false positive for user credential 820. In this example, bloom filter 708 is generated from user credentials that are stored in an enterprise credentials data store 850. For example, such an enterprise credentials data store can be (securely) maintained by an authentication server that maintains an AD or other LDAP directory of enterprise user credentials for an enterprise network, such as can be provided by authentication server 450 for enterprise network 420 as similarly described above with respect to FIG. 4. In this example, the user credentials 820 and 840 can include both a username and a password to facilitate a lookup of the user credentials against the enterprise credentials data store/directory, such as further described below with respect to FIGS. 8A and 8C.

Referring to FIG. 8A, a match is performed using user credential 820 (802). Bloom filter 708 reports an "accept," (804) meaning that there is a 99% chance that user credential 820 is an enterprise user credential (e.g., assuming that the bloom filter was created with the above-described desired false positive rate set at 1%, meaning that an ACCEPT response indicates, with 99% confidence, that the credential (username and/or password being queried for a match with the bloom filter) is present in the enterprise user credentials data used to generate/compile the bloom filter, which are the enterprise user credentials stored in enterprise credentials data store 850 in this example). Whether user credential 820 is actually present in enterprise credentials data store 850 is determined. The verification of the bloom filter ACCEPTance (e.g., reported match/hit) is performed by querying enterprise credentials data store 850 using user credential 820 (806). As mentioned above, the ACCEPTance of user credential 820 by the bloom filter was a false positive in this example. As a result, user credential 820 is not present in enterprise credentials data store 850. Accordingly, the query of enterprise credentials data store 850 for user credential 820 will fail (808) (e.g., respond to the query by indicating that there is not a result/match for user credential 820 in the enterprise credentials data store).

Referring to FIG. 8B, a match against bloom filter 708 for user credential 830 is performed (832). The bloom filter reports a REJECT (834), indicating with 100% confidence that user credential 830 is not present in enterprise credentials data store 850. There is accordingly no need to perform lookups against enterprise credentials data store 850 using user credential 830.

Referring to FIG. 8C, a match against bloom filter 708 for user credential 840 is performed (842). The bloom filter reports an ACCEPT, (844) meaning that there is a 99% chance that user credential 840 is present in enterprise credentials data store 850. Next, a query of enterprise credentials data store 850 is performed using user credential 840 (846). In this case, user credential 840 is present in enterprise credentials data store 850 and so a match response is returned (848). The verification that the user credential 840 matches the user's enterprise credentials can then be used by the firewall to enforce any applicable rules (e.g., based on a policy). In this case, for example, Alice's attempt to access an external site using her enterprise credentials with her browser can be blocked (e.g., or another action can be performed by the firewall based on a policy, such as to alert, log, continue to monitor the session, notify Alice to change her username and password for that external site and/or for her enterprise account, Alice can be required to change her enterprise credentials when she next attempts to authenticate to access her enterprise account, and/or other actions can be performed).

In one embodiment, the bloom filter (e.g., one or more of the bloom filters) includes other credentials related data in addition to the above-described enterprise user credentials. For example, the firewall can be configured to similarly monitor for user credentials data using a blacklist, and the blacklist can be transformed into a bloom filter (e.g., one or more bloom filters) to facilitate an efficient and secure storage of the blacklist for implementing the techniques for credentials enforcement using the firewall as similarly described above. As similarly described above, the blacklist can include/specify credentials such as enterprise credentials (e.g., username and/or password) as described above with respect to bloom filter 708 and/or 720, and the blacklist can also include other credentials related data in the same or a different bloom filter, such as one or more of the following: leaked passwords, custom blacklisted credentials ("weak" passwords), and/or other credentials of interest (e.g., credentials associated with enterprise users' accounts on external sites that are used for corporate business purposes, such as accounts for cloud storage such as Box® or Dropbox® or used for corporate purposes, cloud work productivity or sales applications such as Google® and/or Salesforce.com® accounts used for corporate purposes, and/or marketing accounts using social network external sites such as Facebook® or Twitter® accounts used for corporate purposes). In this example, the credentials enforcement using a firewall can be used to prevent users behind the firewall from giving out/reusing their credentials (e.g., enterprise or other login credentials) to an external site (e.g., a third party web site(s) that may be compromised in the future (registration); and/or web sites categorized as unknown and/or phishing sites). As another example, the credentials enforcement using a firewall can be used to alert users behind the firewall if their currently used credentials (e.g., enterprise or other login credentials) have been added to a blacklist upon their next login attempt. As yet another example, the blacklist can be used for intrusion prevention via detecting invalid brute forced blacklisted credentials.

In one embodiment, other credentials data as described above that can be included in the blacklist can be stored in a cache such as cache 706 or 714 as described above with respect to FIG. 7, and the firewall can check cache 706 and/or 714 as well as bloom filter 708 and/or 720 to perform credentials enforcement using the firewall. For example, certain of these other credentials related data may be less sensitive and, thus, can be simply cached in plaintext. In some cases, such other credentials related data included in the blacklist that can be cached in plaintext can include, for example, one or more of the following: leaked passwords, custom blacklisted credentials ("weak" passwords), and/or other credentials related data included on the blacklist. Accordingly, in this example, the above-described operations of checking for matches of extracted user credentials data with bloom filter 708 can also include performing an additional check against the cache (e.g., cache 706 and/or 714). For instance, assume that a check of user credentials 830 results in a reject response from bloom filter 708 as similarly described above with respect to FIG. 8B, then an additional operation can be performed to check if there is a hit for user credential data 830 against a cache storing other blacklist data (e.g., cache 706 and/or 714).

Figure 9:
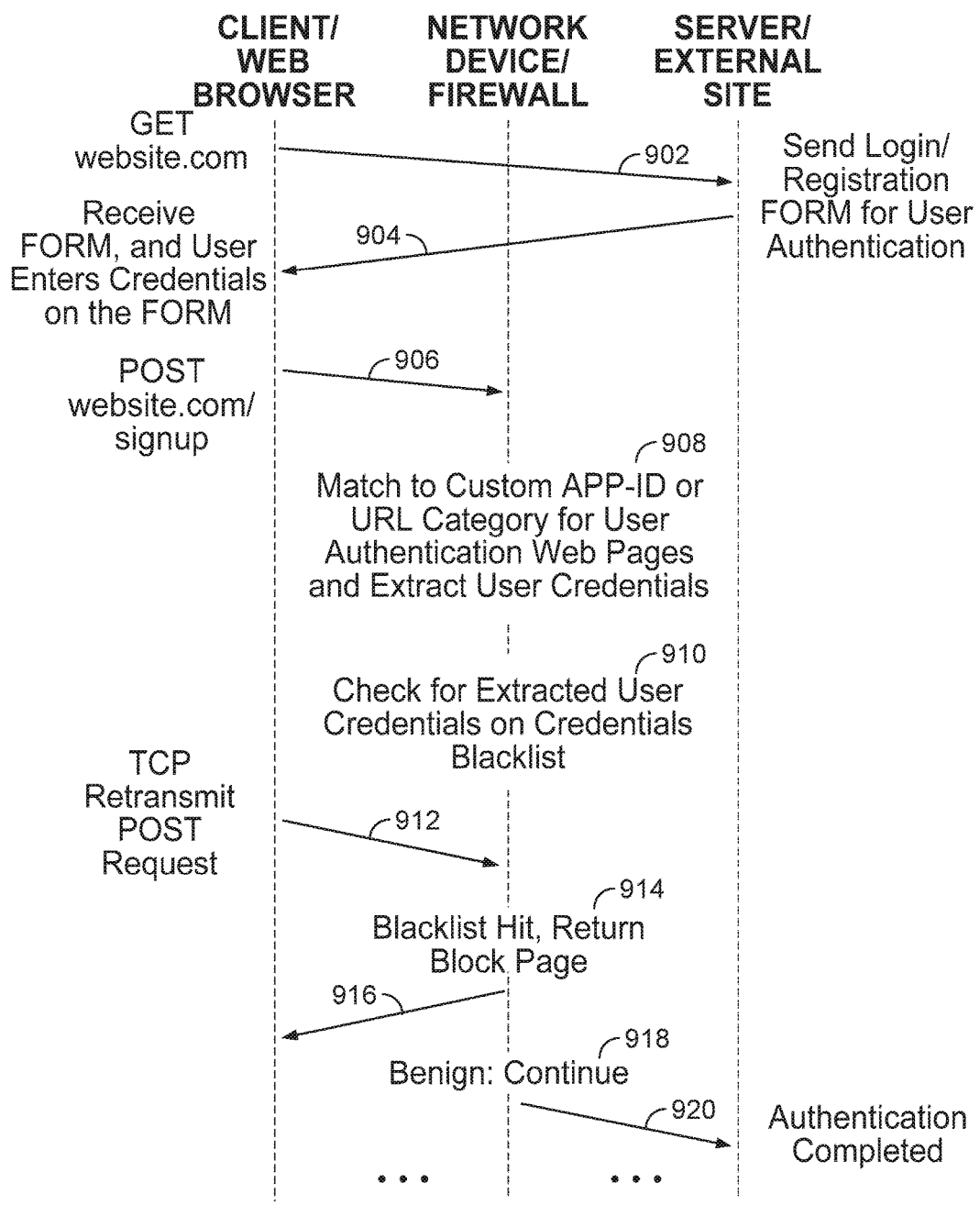
FIG. 9 is a network protocol diagram illustrating an example of network activities monitored by a network device for providing credentials enforcement using a firewall in accordance with some embodiments.

Techniques for Monitoring Network Activity for Credentials Enforcement Using a Firewall FIG. 9 is a network activity diagram illustrating an example of network activities monitored by a network device for providing credentials enforcement using a firewall in accordance with some embodiments. In various embodiments, the activity performed by the network device/firewall is performed by network device 402/firewall 412. In this example, the client/web browser activity can be performed by one of clients 404A-C, and the server/external site activity can be performed by one of server 408A-C.

Referring to FIG. 9, the network activity begins at 902 when the client/web browser sends a GET website.com request to access the server/external site. For example, a user may attempt to access an external website via the Internet. As shown, the enterprise network is protected by the security device/firewall, which can monitor network activities performed by the client/web browser attempting to communicate with the server/external site.

At 904, the server/external site responds to the GET website.com request from the client/web browser by sending a login and/or registration FORM for user authentication. For example, the default response from the external website can be to send a response that is the standard login FORM (e.g., a HyperText Markup Language (HTML) FORM) to access the website/online service. The standard login FORM may also include a new registration FORM (e.g., or may include a link that allows the user to select that the user needs to complete a new registration FORM, and then the server can respond by sending the new registration FORM to the client/web browser).

As also shown in FIG. 9, the registration/login FORM is received at the client/web browser. The user can then enter their user credentials (e.g., existing user credentials for that user for that external website/online service, or new user credentials so that the user can obtain credentials for access to that external website/online service). The user then submits the completed registration/login FORM, and the client/web browser sends the completed form via a POST of that form shown as POST website.com/signup at 906.

In one embodiment, the network device/firewall intercepts the POST of that form and performs network monitoring activities to implement credentials enforcement using various techniques described herein. In an example implementation, the network device/firewall can also drop one or more network packets containing the intercepted POST from the client/web browser (which will be retransmitted by the client/web browser later) such that sufficient time is available for determining whether to allow/block the session/network activities based on activities performed, for example, at 908 and 910, without the risk of a credential being leaked.

At 908, the network device/firewall matches to a custom APP-ID or URL category for user authentication pages to decode the FORM and extract the user credentials entered into the FORM. For example, the APP-ID component of the network device/firewall, such as similarly described above with respect to FIG. 1, can identify the posted FORM as an HTTP protocol communication, and the network device/firewall can select an HTTP decoder that can parse the posted FORM and extract the username and/or password entered into the HTML form. As another example, the URL (e.g., website.com/signup) can match a URL category for website authentication pages, and the network device/firewall can implement a custom decoder to extract the username and/or password entered into the HTML form. In an example implementation, such an HTML form can be decoded and parsed to extract contents associated with a username input field and/or a password input field (e.g., an HTTP/HTML content decoder can extract input type=password), and/or various other techniques can be implemented to extract such user credentials from the HTML form or a subsequent RESTful request (e.g., HTTP GET/POST/PUT) or other network requests (e.g., other types of forms/web pages/Remote Procedure Calls).

In one embodiment, the network device/firewall can also send the URL (e.g., website.com/signup) and/or extracted features of the login/registration FORM to a cloud security service for further analysis, such as cloud security service 410 as shown in FIG. 4. For example, the cloud security service can perform further analysis on the URL and/or extracted features of the login/registration FORM to determine whether the URL should be added to a URL category, such as for untrusted and/or phishing/malware sites (e.g., based on attributes associated with the FORM, such as whether passwords are securely communicated to the external website using a secure communication protocol, such as HTTPS, SSL, and/or another secure communication protocol, and/or other attributes can be analyzed for similar or other purposes by the cloud security service, such as to similarly detect phishing sites based on these and/or other heuristics that can be associated with a phishing site form). Example extracted features of the login/registration FORM (e.g., or other web page/content) can include URL, field names, HTTP headers, request(s) for client-to-server and/or server-to-client, and/or other features can be extracted and sent to the cloud security service for further analysis (e.g., as such may assist in further analysis for targeted phishing attacks that will appear different to targeted users and/or based on different user agent/version of platform/OS, etc.).

In one embodiment, the network device/firewall also extracts a user ID associated with the monitored session for the client/browser based on a source IP address determined to be associated with the monitored session using the APP-ID component as similarly described above. For example, the user ID can facilitate credentials enforcement techniques described herein (e.g., to verify a match of enterprise user credentials using the user ID and the extracted password to query the authentication server, such as similarly described above with respect to FIGS. 8A and 8C).

In one embodiment, the network device/firewall applies a URL pre-filtering stage to determine whether the requested URL, which is associated with website.com in this example, is a trusted site (e.g., is on a whitelist for purposes of applying credentials enforcement using the firewall). If so (e.g., the URL is whitelisted for purposes of credential enforcement), then the network device can bypass performing the activities described above at 908 and 910. If not (e.g., the URL is not whitelisted for purposes of credential enforcement), then the network device performs the operations at 906 including activities described above at 908 and 910.

In one embodiment, the network device/firewall intercepts the POST of that form and performs network monitoring activities to implement credentials enforcement using various techniques described herein. At 910, the network device/firewall checks for extracted user credentials on a credentials blacklist. For example, the network device/firewall can determine whether the extracted user credentials (e.g., username and/or password) match any credentials data included on one or more blacklists for credentials related data. The determination of whether the extracted user credentials match any credentials data included on one or more blacklists for credentials related data can be performed using various techniques described herein, such as similarly described above with respect to FIGS. 7 and 8A-C (e.g., performing a lookup/query of a cache(s) and/or a bloom filter that includes credentials related data, such as a blacklist (s) for credentials related data; and, in some cases, if a query of a bloom filter for enterprise user credentials returns a match/hit, then the network device/firewall can verify whether the extracted user credentials match the user's credentials by querying the authentication server as similarly described above). In some cases, if the blacklist includes credentials data that has been transformed, such as by performing one or more hash operations on a username and/or a password, then the same hash operation(s) would be performed on the extracted username and/or password (e.g., as pre-processing operations) prior to performing the lookup/matching operation at 910, such as similarly described herein.

At 912, the client/web browser sends a TCP retransmit POST request. For example, given that the client/web browser does not (timely) receive a response to the POST website.com/signup at 906, which is a result of the above-described interception of that HTTP POST request by the network device/firewall, then the client/web browser will generally retransmit that POST request.

In some cases, such as at 914, a result of the check for the extracted user credentials on the credentials blacklist indicates that there is a match/hit with the credentials blacklist operation performed at 910. As a result, the network device/firewall can perform a responsive action, such as to return a block page, as shown at 916. For example, a credentials enforcement policy can indicate that in an event of such a match/hit of the extracted user credentials on the credentials blacklist, the network device/firewall returns a block page to notify the client/web browser that the requested user authentication on the external web site was blocked by an enterprise network/security/firewall policy (e.g., user is notified via the block page returned to the client device/browser).

In other cases, such as at 918, a result of the check for the extracted user credentials on the credentials blacklist indicates that there is not a match/hit with the credentials blacklist operation performed at 910. As a result, the network device/firewall determines that the network activity is a benign activity based on the credentials enforcement policy, and the network device forwards the TCP retransmit POST request to the server/external site (e.g., the TCP retransmit POST request can be cached at the network device/firewall for the monitored session associated with the client/web browser if and until the network activity is deemed benign and allowed to continue), such as shown at 920. As such, the authentication can be completed when the server/external site receives the retransmitted POST request as shown.

Processes for Credentials Enforcement Using a Firewall

Figure 10:
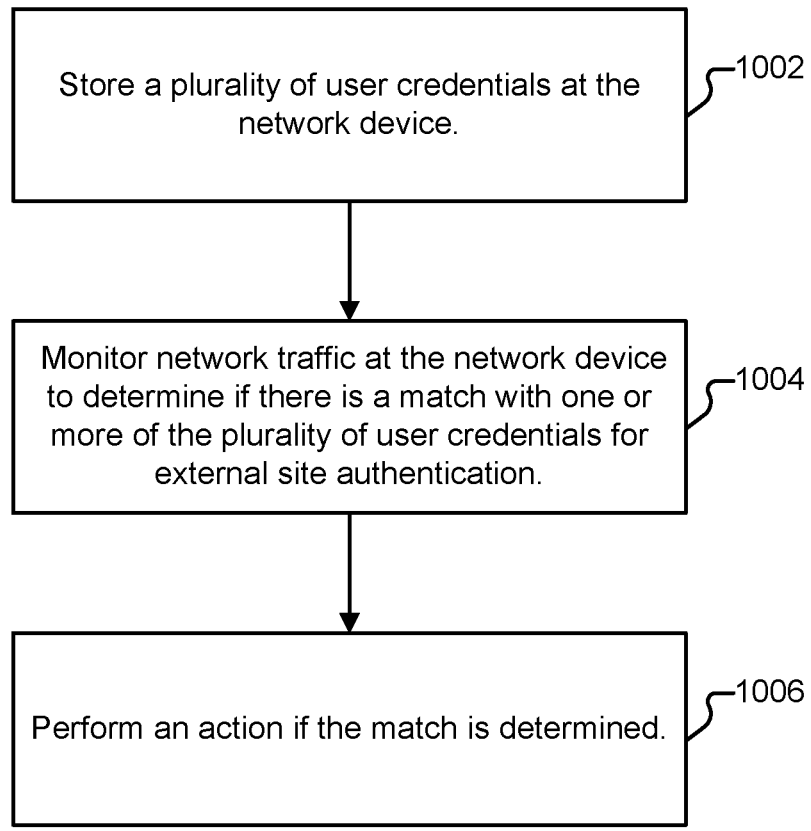
FIG. 10 is a flow diagram for performing credentials enforcement using a firewall in accordance with some embodiments.

FIG. 10 is a flow diagram for performing credentials enforcement using a firewall in accordance with some embodiments. In various embodiments, the process shown in FIG. 10 is performed by the network device/firewall as similarly described above with respect to FIGS. 1-9.

At 1002, a plurality of user credentials is stored at the network device.

At 1004, monitoring network traffic at the network device to determine if there is a match with one or more of the plurality of user credentials for external site authentication is performed. For example, the network device/firewall can detect a reuse of enterprise credentials (e.g., including an enterprise account password) on an external site (e.g., on an unauthorized and/or unknown/untrusted external site).

In one embodiment, monitoring network traffic between a client/web browser and a server/external site includes decrypting the network traffic to perform the disclosed techniques for credentials enforcement using the firewall. For example, the network traffic between a client and a server can be decrypted for monitoring using the firewall. In this example, the network device/firewall can send a request to establish the encrypted session on behalf of the client to the remote server, and the network device/firewall can send an encrypted session response to the client on behalf of the remote server using a session key associated with the network device/firewall, such as similarly described above with respect to FIG. 3B. The encrypted traffic between the client and remote server can then be decrypted at the network device/firewall so that the network device/firewall can monitor decrypted session traffic between the client and the remote server over the tunnel based on one or more firewall policies, including a credentials enforcement policy.

At 1006, an action is performed if the match is determined. For example, responsive action(s) can include one or more of the following: blocking the network traffic, generating an alert (e.g., send a block page that notifies the user that using enterprise credentials on this external site is not recommended or is prohibited), and/or logging the network activity.

In one embodiment, the network device/firewall is in communication with a cloud security service and can perform the above-described techniques to detect a leak of user credentials (e.g., one or more enterprise credentials, such as including passwords) using shared intelligence from one or more network devices/firewalls that detect enterprise credentials leakage across different sites and/or different network devices/firewalls (e.g., based on brute force password attacks, etc.).

Figure 11:
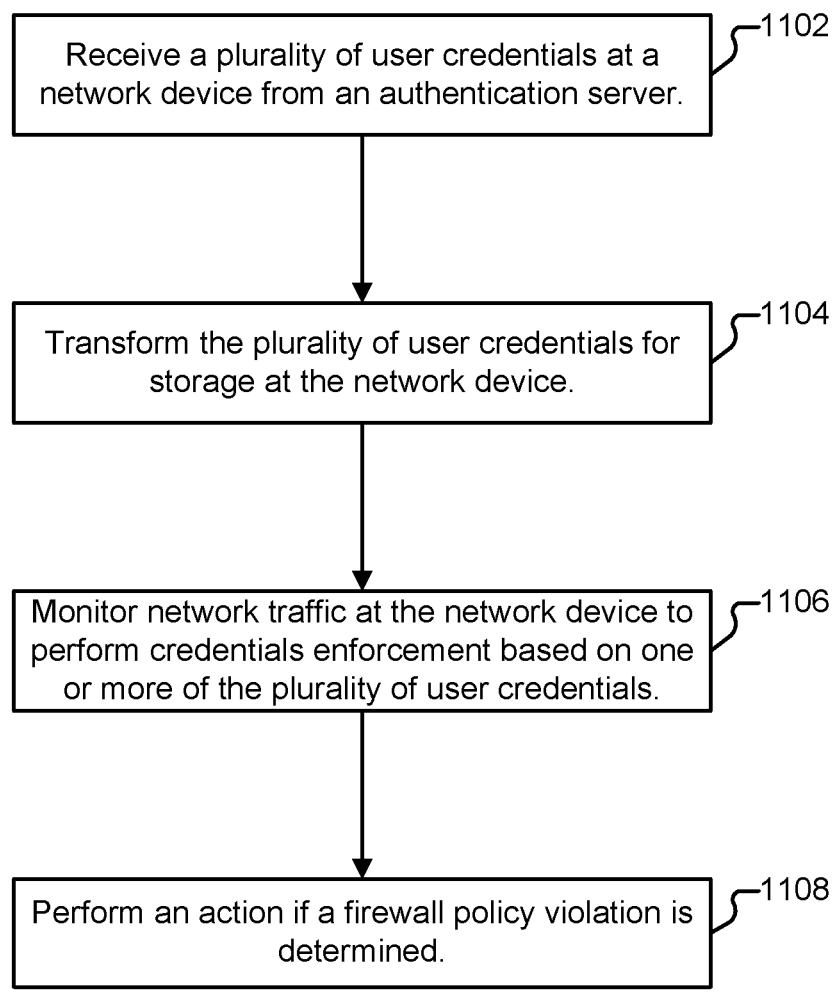
FIG. 11 is a flow diagram for performing credentials enforcement using an efficient and secure store for credentials enforcement using a firewall in accordance with some embodiments.

Processes for Performing Credentials Enforcement Using an Efficient and Secure Store for Credentials Enforcement Using a Firewall FIG. 11 is a flow diagram for performing credentials enforcement using an efficient and secure store for credentials enforcement using a firewall in accordance with some embodiments. In various embodiments, the process shown in FIG. 11 is performed by the network device/firewall as similarly described above with respect to FIGS. 1-9.

At 1102, a plurality of user credentials is received at a network device from an authentication server. For example, a network device can periodically collect user credentials from the authentication server (e.g., using an agent executed on the authentication server and/or via an API or other interface if such integration is supported by the authentication server; in another example implementation using a RODC approach as similarly described above, the agent on the AD server can register itself and can emulate as an RODC of the authentication server to receive the full or partial list of credentials from the AD server, and receive pushed updates on all changes of those credentials, which can then be utilized to perform the disclosed techniques as similarly described herein). In some cases, a username and a hash of the password can be extracted from an authentication server, such as by decrypting such credentials stored at an AD server using well known techniques (e.g., current versions of the Microsoft® Active Directory® (AD) maintain passwords in an NTLM hashed format, and there are well known techniques for performing a bulk extraction of the NTLM hashed format of such passwords stored/maintained by the AD, such as to create Volume Shadow Copy Service and then extract the hashes from NTDS.dit as further described at http://security.sunera.com/2014/05/starting-active-directory-password.html). As such, any comparison of detected passwords based on network monitoring by the network device/firewall can be compared to the extracted enterprise passwords by applying the same hashing operation(s) to such detected passwords as a preprocessing operation(s) prior to the comparing operation(s) in order to effectively detect a potential match.

In one embodiment, additional user credentials can be collected (e.g., collected, extracted, generated, and/or received). For example, additional user credentials can be collected from other sources, such as leaks shared publicly, other local user credentials, former/expired enterprise credentials, leaked/compromised enterprise credentials, other leaked/compromised local user credentials, and/or weak user credentials (e.g., weak passwords, which can include dictionary words, based on a password complexity requirement/algorithm, etc.). In an example implementation, the credentials can just include passwords. In another example implementation, the credentials can include usernames and passwords (e.g., a bloom filter that is generated based on both usernames and passwords will generally yield a lower false positive match/hit rate).

At 1104, transforming the plurality of user credentials for storage at the network device is performed. For example, the plurality of user credentials can be transformed by applying a hash to the user credentials. In one embodiment, the plurality of user credentials are transformed into a bloom filter, in which one or more bloom filters are generated to efficiently and securely store the plurality of user credentials. As similarly described above, one or more bloom filters can be generated for the one or more sources of credentials. If there are multiple different sources/formats of credentials related data being used to generate the bloom filter, then the credentials related data can be normalized (e.g., transformed into a canonical format) as a preprocessing operation before transforming that credentials related data into the bloom filter (e.g., if some of the passwords are hashed using a particular hash function, and some of the other passwords are in plaintext, then the plaintext passwords can be hashed using that same particular hash function). In some cases, multiple different, distinct bloom filters are generated and, in such cases, the intercepted credentials can be transformed into the respective normalized/canonicalized formats and sent to each bloom filter (e.g., in serial or parallel operations).

For example, intercepted passwords (e.g., passwords extracted from monitored network activity, such as when a monitored user's session attempts to send a password to an external site for user authentication at the external site) can be preprocessed prior to performing the bloom filter query (e.g., to perform the same hashing function(s) operations on the intercepted passwords as were performed on the credentials related data as part of the process that generated that bloom filter). In an example implementation, such preprocessing can include performing a hash on a subset of first x/4 bits and last x/4 bits of the intercepted content/password, and then performing the query of the bloom filter. In an example implementation, the bloom filter can be implemented using a bit-based bloom filter and updating the bloom filter periodically if changes to AD/LDAP are collected/received (e.g., a changed username/password, a new username/password, a deleted username/password, etc.).

At 1106, network traffic is monitored at the network device to perform credentials enforcement based on one or more of the plurality of user credentials. For example, network activity/traffic can be monitored by the network device/firewall to detect and extract usernames and/or passwords being transmitted from a server to a client and/or from a client to a server (e.g., outbound from the protected enterprise network or inbound into the protected enterprise network), and then check such extracted credentials information against passwords, usernames and passwords, and/or all domain users (e.g., LDAP/, GROUP/, user/, non-system/).

At 1108, an action is performed if a firewall policy violation is determined, in which the firewall policy includes a policy for credentials enforcement. For example, the action can include one or more of the following: blocking the network traffic, generating an alert (e.g., send a block page that notifies the user that use of enterprise credentials on this external site is not recommended (a continue page/button) or is prohibited (no continue button)), and/or logging the network activity. As another example, the network device/firewall can communicate with an enterprise authentication server to lock the user credentials (e.g., by sending a lock-out request to an agent executed on the authentication server or using API to communicate the lock-out request to the authentication server), and/or to activate additional authentication requirements, such as two-factor-authentication, when such user is attempting to access a protected resource.

Figure 12:
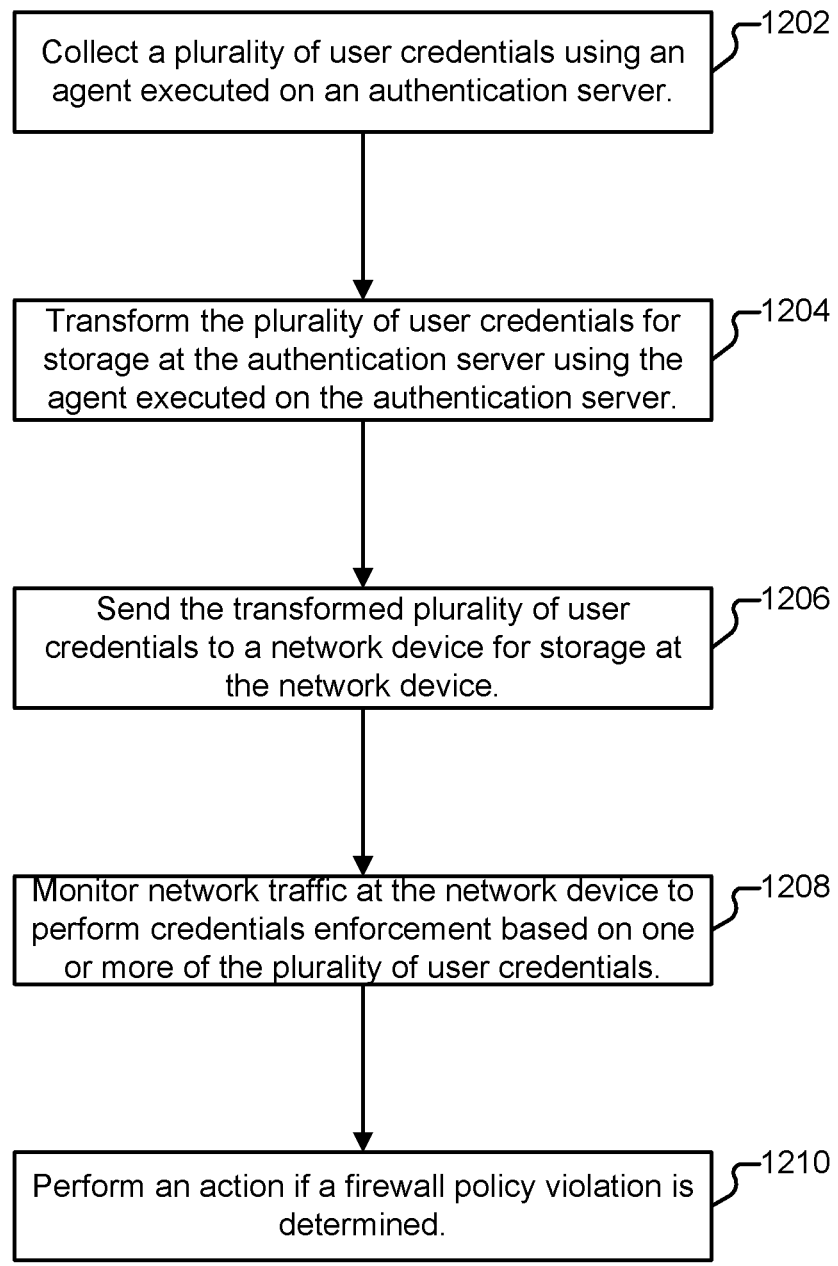
FIG. 12 is another flow diagram for performing credentials enforcement using an efficient and secure store for credentials enforcement using a firewall in accordance with some embodiments.

FIG. 12 is another flow diagram for performing credentials enforcement using an efficient and secure store for credentials enforcement using a firewall in accordance with some embodiments. In various embodiments, the process shown in FIG. 12 is performed by the network device/firewall as similarly described above with respect to FIGS. 1-9.

At 1202, a plurality of user credentials is collected using an agent executed on an authentication server. For example, the agent (e.g., ASA 454 as shown in FIG. 4) can periodically collect user credentials from the authentication server (e.g., the agent can extract enterprise credentials from the authentication server and/or intercept enterprise credentials sent to the authentication server, such as using various techniques described herein). In some cases, a username and a hash of the password can be extracted from an authentication server, such as by decrypting such credentials stored at an AD server using well known techniques (e.g., current versions of the Microsoft® Active Directory® (AD) maintain passwords in an NTLM hashed format, and there are well known techniques for performing a bulk extraction of the NTLM hashed format of such passwords stored/maintained by the AD, such as to create Volume Shadow Copy Service and then extract the hashes from NTDS.dit as further described at http://security.sunera.com/2014/05/starting-active-directory-password.html). As such, any comparison of detected passwords based on network monitoring by the network device/firewall can be compared to the extracted enterprise passwords by applying the same hashing operation to such detected passwords as a preprocessing operation(s) prior to the comparing operation in order to effectively detect a potential match. In an example implementation, the collected credentials can just include passwords. In another example implementation, the collected credentials can include usernames and passwords (e.g., a bloom filter that is generated based on both usernames and passwords will generally yield a lower false positive match/hit rate).

At 1204, transforming the plurality of user credentials for storage at the authentication server using the agent executed on the authentication server is performed. For example, the plurality of user credentials can be transformed by applying a hash to the user credentials. In one embodiment, the plurality of user credentials are transformed into a bloom filter, in which one or more bloom filters are generated to efficiently and securely store the plurality of user credentials. As similarly described above, one or more bloom filters can be generated for the one or more sources of credentials. If there are multiple different sources/formats of credentials related data being used to generate the bloom filter, then the credentials related data can be normalized (e.g., transformed into a canonical format) as a preprocessing operation(s) before transforming that credentials related data into the bloom filter (e.g., if some of the passwords are hashed using a particular hash function, and some of the other passwords are in plaintext, then the plaintext passwords can be hashed using that same particular hash function). In some cases, multiple different, distinct bloom filters are generated and, in such cases, the intercepted credentials can be transformed into the respective normalized/canonicalized formats and sent to each bloom filter (e.g., in serial or parallel operations).

At 1206, the transformed plurality of user credentials is sent to a network device. For example, if the plurality of collected user credentials is transformed into a bloom filter(s), then the bloom filter(s) can be (securely) communicated to the network device. In this example, the network device can be configured to perform credentials enforcement based on one or more of the plurality of user credentials using the bloom filter (e.g., as similarly described above with respect to FIGS. 8A-C and as further described below). As also described above, the agent can be configured to securely erase any temporary storage of any extracted/intercepted user credentials from any storage medium/device of the authentication server.

At 1208, network traffic is monitored at the network device to perform credentials enforcement based on one or more of the plurality of user credentials. For example, network activity/traffic can be monitored by the network device/firewall to detect and extract usernames and/or passwords being transmitted from a server to a client and/or from a client to a server (e.g., outbound from the protected enterprise network or inbound into the protected enterprise network), and then check such extracted credentials information against passwords, usernames and passwords, and/or all domain users (e.g., LDAP/, GROUP/, user/, non-system/) using the transformed plurality of user credentials (e.g., using the bloom filter(s), such as similarly described above with respect to FIGS. 8A-C and further described below).

For example, intercepted passwords can be preprocessed prior to performing the bloom filter query (e.g., to perform the same hashing function(s) operations on the intercepted passwords as were performed on the credentials related data as part of the process that generated that bloom filter). In an example implementation, such preprocessing can include performing a hash on a subset of first x/4 bits and last x/4 bits of the intercepted content/password, and then performing the query of the bloom filter. In an example implementation, the bloom filter can be implemented using a bit-based bloom filter and updating the bloom filter periodically if changes to AD/LDAP are collected/received (e.g., a changed username/password, a new username/password, a deleted username/password, etc.).

At 1210, an action is performed if a firewall policy violation is determined, in which the firewall policy includes a policy for credentials enforcement. For example, the action can include one or more of the following: blocking the network traffic, generating an alert (e.g., send a block page that notifies the user that use of enterprise credentials on this external site is not recommended or is prohibited), and/or logging the network activity. As another example, the network device/firewall can communicate with an enterprise authentication server to lock the user credentials (e.g., by sending a lock-out request to an agent on the authentication server or using API to communicate the lock-out request to the authentication server).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for a credentials store for credentials enforcement using a firewall, comprising:
 a processor of a network device configured to:
  receive a bloom filter from an agent executed on an authentication server, wherein the bloom filter is generated by the agent based on a transformation of a plurality of user credentials extracted from the authentication server and/or intercepted at the authentication server, wherein one or more of the plurality of user credentials includes a username and a password;
  store the bloom filter in a cache on the network device;
  monitor network traffic at the network device to perform credentials enforcement using the bloom filter, wherein to monitor the network traffic comprises to monitor network communications between a client and an external site;
  determine if the client sends a request that includes user credentials for authentication at the external site using the bloom filter; and
  perform an action based on a security policy if a match is determined with one or more of the plurality of user credentials, wherein to perform the action comprises to perform the action in response to a determination that the client sent the request that includes the user credentials for authentication at the external site that match the one or more of the plurality of user credentials stored at the network device, wherein the action includes blocking the user from accessing the external site until a different user credential is created; and
 a memory coupled to the processor and configured to provide the processor with instructions.

2. The system recited in claim 1, wherein the network device includes a firewall that implements the security policy.

3. The system recited in claim 1, wherein the agent executed on the authentication server collects the plurality of user credentials and transforms the plurality of user credentials into the bloom filter.

4. The system recited in claim 1, wherein the agent executed on the authentication server collects the plurality of user credentials and transforms the plurality of user credentials into the bloom filter, and wherein the agent executed on the authentication server sends the bloom filter to the network device.

5. The system recited in claim 1, wherein the bloom filter is stored in a low latency cache on the network device.

6. The system recited in claim 1,
wherein the action includes activating an additional authentication request based on a two-factor authentication when an attempt to access a protected resource is detected.

7. The system recited in claim 1, wherein the processor is further configured to:
block the network communications if a violation of the security policy is determined, wherein the security policy includes a policy for credentials enforcement used in the external site authentication.

8. The system recited in claim 1, wherein the processor is further configured to:
generate an alert if a violation of the security policy is determined, wherein the security policy includes a policy for credentials enforcement used in the external site authentication.

9. The system recited in claim 1, wherein the processor is further configured to:
log the network communications if a violation of the security policy is determined, wherein the security policy includes a policy for credentials enforcement used in the external site authentication.

10. The system recited in claim 1, wherein the processor is further configured to:
extract a username and/or password from user credentials submitted in the request to perform credentials enforcement using the bloom filter.

11. The system recited in claim 1, wherein the processor is further configured to:
extract a username and/or password from user credentials submitted in the request; and
determine if the extracted username and/or password from the user credentials matches one or more of the plurality of user credentials to perform credentials enforcement using the bloom filter.

12. The system recited in claim 1, wherein the processor is further configured to:
extract a username and/or password from user credentials submitted in the request;
determine if the extracted username and/or password from the user credentials matches one or more of the plurality of user credentials to perform credentials enforcement using the bloom filter; and
if the username and/or password is determined to match one or more of the plurality of user credentials, then perform a responsive action.

13. The system recited in claim 1, wherein the processor is further configured to:
extract a username and password from user credentials submitted in the request;
determine if the extracted username and password from the user credentials match one or more of the plurality of user credentials to perform credentials enforcement using the bloom filter; and
if the username and password are determined to match one or more of the plurality of user credentials, then verify whether the username and password match one or more of the plurality of user credentials by querying the authentication server using the username and password.

14. A method for a credentials store for credentials enforcement using a firewall, comprising:
receiving a bloom filter from an agent executed on an authentication server, wherein the bloom filter is generated by the agent based on a transformation of a plurality of user credentials extracted from the authentication server and/or intercepted at the authentication server, wherein one or more of the plurality of user credentials includes a username and a password;
storing the bloom filter in a cache on a network device;
monitoring network traffic at the network device to perform credentials enforcement using the bloom filter, wherein the network traffic comprises monitoring network communications between a client and an external site;
determining if the client sends a request that includes user credentials for authentication at the external site using the bloom filter; and
performing an action based on a security policy if a match is determined with one or more of the plurality of user credentials, wherein the performing of the action comprises performing the action in response to a determination that the client sent the request that includes the user credentials for authentication at the external site that match the one or more of the plurality of user credentials stored at the network device, wherein the action includes blocking the user from accessing the external site until a different user credential is created.

15. The method of claim 14, wherein the network device includes a firewall that implements the security policy.

16. The method of claim 14, wherein the agent executed on the authentication server collects the plurality of user credentials and transforms the plurality of user credentials into the bloom filter.

17. The method of claim 14, wherein the agent executed on the authentication server collects the plurality of user credentials and transforms the plurality of user credentials into the bloom filter, and wherein the agent executed on the authentication server sends the bloom filter to the network device.

18. The method of claim 14, wherein the bloom filter is stored in a low latency cache on the network device.

19. A computer program product for a credentials store for credentials enforcement using a firewall, the computer program product being embodied in a tangible non-transitory computer readable storage medium and comprising computer instructions for:
receiving a bloom filter from an agent executed on an authentication server, wherein the bloom filter is generated by the agent based on a transformation of a plurality of user credentials extracted from the authentication server and/or intercepted at the authentication server, wherein one or more of the plurality of user credentials includes a username and a password;
storing the bloom filter in a cache on a network device;
monitoring network traffic at the network device to perform credentials enforcement using the bloom filter, wherein the network traffic comprises monitoring network communications between a client and an external site;

determining if the client sends a request that includes user credentials for authentication at the external site using the bloom filter, and performing an action based on a security policy if a match is determined with one or more of the plurality of user credentials, wherein the performing of the action comprises performing the action in response to a determination that the client sent the request that includes the user credentials for authentication at the external site that match the one or more of the plurality of user credentials stored at the network device, wherein the action includes blocking the user from accessing the external site until a different user credential is created.

* * * * *

UNITED STATES PATENT AND TRADEMARK OFFICE
CERTIFICATE OF CORRECTION

PATENT NO. : 10,298,610 B2
APPLICATION NO. : 16/030594
DATED : May 21, 2019
INVENTOR(S) : Ashley et al.

Page 1 of 1

It is certified that error appears in the above-identified patent and that said Letters Patent is hereby corrected as shown below:

On the Title Page

In Page 2, Column 2, Item (56), References Cited, US Patent Documents, Cite no 2, Publication no. 2013/0262655, delete "Deschones" and insert --Deschenes--, therefor.

In the Claims

In Column 35, Claim 19, Line 3, after "filter", delete "," and insert --;--, therefor.

Signed and Sealed this
Nineteenth Day of November, 2019

Andrei Iancu
*Director of the United States Patent and Trademark Office*